(12) United States Patent
Jaszewski et al.

(10) Patent No.: US 12,384,504 B2
(45) Date of Patent: Aug. 12, 2025

(54) MARINE DRIVES HAVING SUPPORTING FRAME AND COWLING

(71) Applicant: Brunswick Corporation, Mettawa, IL (US)

(72) Inventors: Wayne M. Jaszewski, West Bend, WI (US); Andrew J. Przybyl, Berlin, WI (US); John A. Groeschel, Theresa, WI (US); Christopher J. Luckett, Stillwater, OK (US); Keith W. Schmidt, Stillwater, OK (US); Stephen R. Collins, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 793 days.

(21) Appl. No.: 17/585,214

(22) Filed: Jan. 26, 2022

(65) Prior Publication Data

US 2023/0257094 A1    Aug. 17, 2023

(51) Int. Cl.
*B63H 20/32* (2006.01)
*B60L 50/60* (2019.01)
*B63H 20/02* (2006.01)

(52) U.S. Cl.
CPC ............ *B63H 20/32* (2013.01); *B60L 50/66* (2019.02); *B63H 20/02* (2013.01); *B60L 2200/32* (2013.01)

(58) Field of Classification Search
CPC .......... B63H 20/32; B63H 20/02; B60L 50/66
See application file for complete search history.

(56) References Cited

U.S. PATENT DOCUMENTS 3,315,631 A * 4/1967 Bass .................... B63H 20/007
                                                          440/97
4,066,032 A * 1/1978 Travis ..................... B63H 23/24
                                                           440/6

(Continued)

FOREIGN PATENT DOCUMENTS

DE        102017105904      9/2017
EP          4219290 A1 * 8/2023 .......... B63H 20/007

(Continued)

OTHER PUBLICATIONS

Extended European Search Report issued in Corresponding European Patent Application No. 23152367.1, dated Jul. 4, 2023.

(Continued)

*Primary Examiner* — S. Joseph Morano
*Assistant Examiner* — Jovon E Hayes
(74) *Attorney, Agent, or Firm* — Andrus Intellectual Property Law, LLP

(57) ABSTRACT

A marine drive is for propelling a marine vessel. The marine drive has a propulsor configured to generate a thrust force in a body of water; a battery that powers the propulsor; and a supporting frame which supports the marine drive relative to marine vessel. The supporting frame has a monolithic body defining a frame interior, and further has a support leg extending downwardly from the monolithic body and a steering arm extending forwardly from monolithic body. A cowling is fixed to the supporting frame via at least one hidden fastener that extends from the frame interior, through the supporting frame, and into engagement with the cowl body, wherein hidden fastener being accessible during installation.

23 Claims, 31 Drawing Sheets

(56) References Cited

U.S. PATENT DOCUMENTS

| | | | |
|---|---|---|---|
| 5,487,687 A * | 1/1996 | Idzikowski | F02B 61/045 |
| | | | 440/88 L |
| 5,662,213 A * | 9/1997 | Kattler | H01H 23/06 |
| | | | 200/6 R |
| 7,249,984 B2 * | 7/2007 | Kobayashi | H01M 8/04201 |
| | | | 440/6 |
| 8,337,264 B2 | 12/2012 | Boebel | |
| 9,180,950 B1 * | 11/2015 | Davenport | B63H 20/32 |
| 9,365,277 B2 * | 6/2016 | Skrzypchak | B63H 20/32 |
| 9,701,383 B1 | 7/2017 | Stuber et al. | |
| 9,963,213 B1 | 5/2018 | Jaszewski et al. | |
| 10,287,963 B2 * | 5/2019 | Tsuno | B63H 20/285 |
| 11,046,409 B2 * | 6/2021 | Wiegele | B63H 20/28 |
| 11,066,140 B1 * | 7/2021 | Huffer | B63H 20/18 |
| 11,183,739 B2 | 11/2021 | Milroy et al. | |
| 11,781,701 B2 | 10/2023 | Kimpara | |
| 11,820,479 B2 | 11/2023 | Kimpara | |
| D1,018,424 S | 3/2024 | Norton | |
| 2011/0244740 A1 * | 10/2011 | Daikoku | B63H 20/007 |
| | | | 440/6 |
| 2012/0064783 A1 * | 3/2012 | Grez | B63H 20/14 |
| | | | 440/6 |
| 2018/0362131 A1 | 12/2018 | He et al. | |
| 2019/0118921 A1 | 4/2019 | Drapeau | |
| 2019/0148700 A1 | 5/2019 | Milroy et al. | |
| 2021/0143710 A1 * | 5/2021 | Sprague | H01M 50/242 |
| 2022/0089261 A1 * | 3/2022 | Bruestle | B63H 23/321 |
| 2023/0087983 A1 * | 3/2023 | Kimpara | B63H 20/007 |
| | | | 440/3 |
| 2024/0270365 A1 * | 8/2024 | Podell | H01M 10/66 |

FOREIGN PATENT DOCUMENTS

| | | | | |
|---|---|---|---|---|
| JP | 2005153727 | 6/2005 | | |
| JP | 2005162054 | 6/2005 | | |
| JP | 2005162055 | 6/2005 | | |
| JP | 2005162055 A * | 6/2005 | | B63H 20/007 |
| JP | 2013252736 | 12/2013 | | |

OTHER PUBLICATIONS

Extended European Search Report issued in European Patent Application No. 23152371.3, dated Jul. 4, 2023.

Unpublished U.S. Appl. No. 17/469,479, "Propulsion Devices Having Electric Motors for Marine Vessels and Methods for Making the Same.".

Unpublished U.S. Appl. No. 17/487,116, "Outboard Motor that ss Removable from Transom Clamp Bracket".

Unpublished U.S. Appl. No. 17/509,739, "Integrated Copilot and Locking Mechanism for Marine Drives".

Unpublished U.S. Appl. No. 17/550,463, "Marine Drive Lower Unit Having Extension Leg".

Unpublished U.S. Appl. No. 17/554,540, "Outboard Motors Having Side and Rear Laydown Capability".

Extended European Search Report issued in European Patent Application No. 23152365.5, dated Jun. 26, 2023.

Extended European Search Report issued in European Patent Application No. 23208910.2, dated Apr. 23, 2024.

Office Action issued in U.S. Appl. No. 17/984,440, dated May 15, 2025.

* cited by examiner

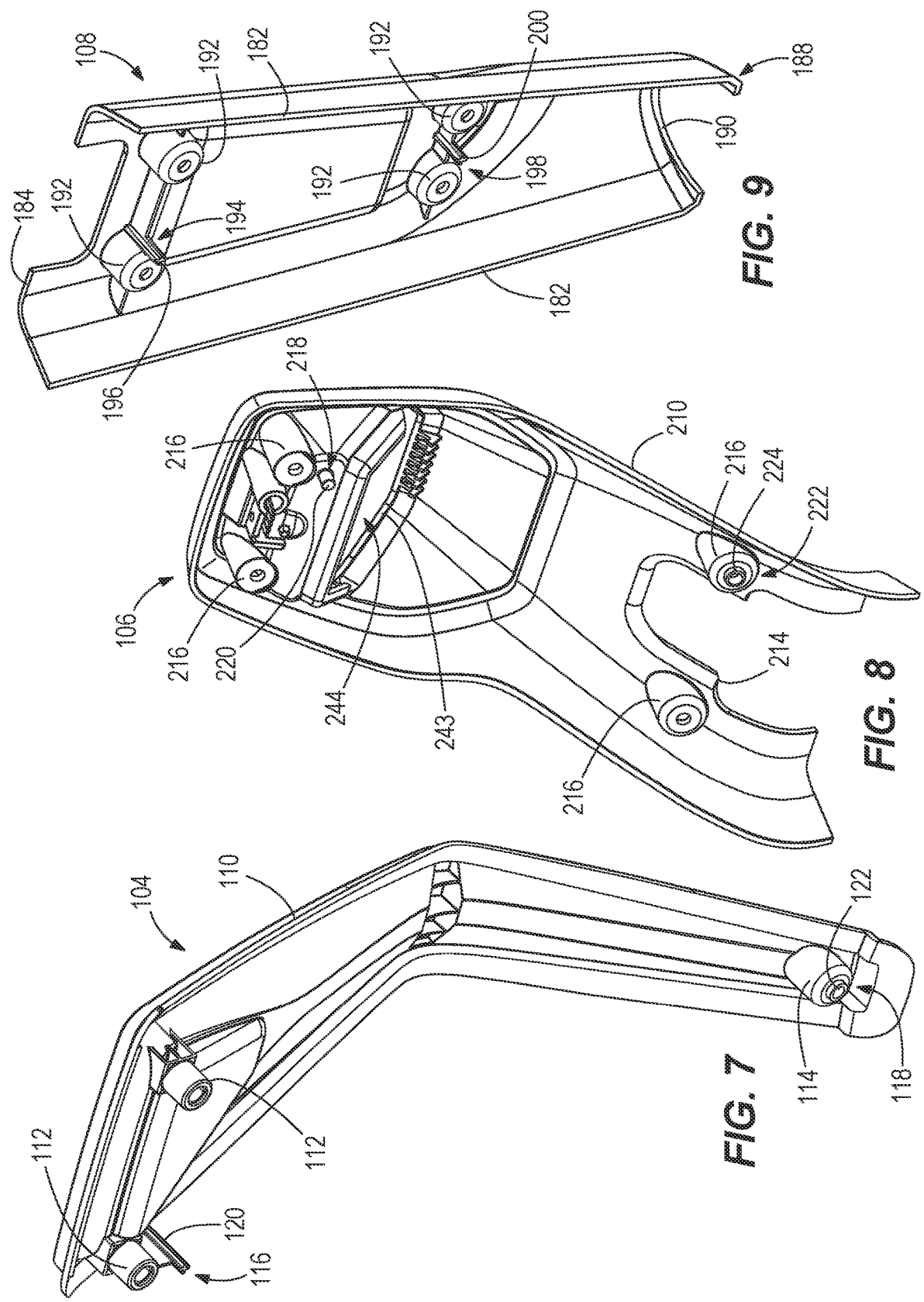

MARINE DRIVES HAVING SUPPORTING FRAME AND COWLING

FIELD

The present disclosure relates to marine drives for propelling a marine vessel in water.

BACKGROUND

The following U.S. Patents are incorporated by reference in entirety.

U.S. Pat. No. 9,701,383 discloses a marine propulsion support system having a transom bracket, a swivel bracket, and a mounting bracket. A drive unit is connected to the mounting bracket by a plurality of vibration isolation mounts, which are configured to absorb loads on the drive unit that do not exceed a mount design threshold. A bump stop located between the swivel bracket and the drive unit limits deflection of the drive unit caused by loads that exceed the threshold. An outboard motor includes a transom bracket, a swivel bracket, a cradle, and a drive unit supported between first and second opposite arms of the cradle. First and second vibration isolation mounts connect the first and second cradle arms to the drive unit, respectively. An upper motion-limiting bump stop is located remotely from the vibration isolation mounts and between the swivel bracket and the drive unit.

U.S. Pat. No. 9,963,213 discloses a system for mounting an outboard motor propulsion unit to a marine vessel transom. The propulsion unit's midsection has an upper end supporting an engine system and a lower end carrying a gear housing. The mounting system includes a support cradle having a head section coupled to a transom bracket, an upper structural support section extending aftward from the head section and along opposite port and starboard sides of the midsection, and a lower structural support section suspended from the upper structural support section and situated on the port and starboard sides of the midsection. A pair of upper mounts couples the upper structural support section to the midsection proximate the engine system. A pair of lower mounts couples the lower structural support section to the midsection proximate the gear housing. At least one of the upper and lower structural support sections comprises an extrusion or a casting.

U.S. patent application Ser. No. 17/469,479 discloses a propulsion device for rotating a propulsor to propel a marine vessel. The propulsion device includes a drive housing having a cavity that extends along a first central axis. A motor is positioned within the cavity. The motor rotates a shaft extending along a second central axis that is non-coaxial with the first central axis. The shaft is configured to rotate the propulsor to propel the marine vessel.

U.S. patent application Ser. No. 17/487,116 discloses an outboard motor having a transom clamp bracket configured to be supported on a transom of a marine vessel and a swivel bracket configured to be supported by the transom clamp bracket. A propulsion unit is supported by the swivel bracket, the propulsion unit comprising a head unit, a midsection below the head unit, and a lower unit below the midsection. The head unit, midsection, and lower unit are generally vertically aligned with one another when the outboard motor is in a neutral tilt/trim position. The propulsion unit is detachable from the transom clamp bracket.

U.S. patent application Ser. No. 17/509,739 discloses an apparatus for removably supporting a marine drive on a marine vessel. The apparatus has a transom bracket assembly for mounting to the marine vessel, a steering bracket for coupling the marine drive to the transom bracket assembly so the marine drive is steerable relative to the transom bracket assembly and the marine vessel, and an integrated copilot and locking mechanism configured to retain the steering bracket in a plurality of steering orientations. The mechanism is further configured to lock and alternately unlock the steering bracket relative to the transom bracket assembly such that in a locked position the marine drive is retained on the transom bracket assembly and such that in an unlocked position the marine drive is removable from the transom bracket assembly.

U.S. patent application Ser. No. 17/550,463 discloses a marine drive having a supporting frame for coupling the marine drive to a marine vessel, a gearcase supporting a propulsor for propelling the marine vessel in water, an extension leg disposed between the supporting frame and the gearcase, and an adapter plate between the supporting frame and the extension leg. A tube is in the extension leg. The tube has a lower end which is coupled to the gearcase and upper end which is coupled to the adapter plate by a compression nut threaded onto the tube, wherein threading the compression nut down on the tube compressively engages the compression nut with the adapter plate, which in turn clamps the extension leg between the supporting frame and the gearcase.

U.S. patent application Ser. No. 17/554,540 discloses an outboard motor having a cowling, a gearcase, a midsection located axially between the cowling and the gearcase, a steering arm extending forwardly from the midsection, and an anti-ventilation plate between the midsection and the gearcase. A wing extends laterally from the steering arm. The wing, a lateral side of the cowling, and a lateral side of the gearcase together define a side tripod which supports the outboard motor in a side laydown position. The anti-ventilation plate has a rear edge with laterally outer rear support members, which together with the rear of the cowling form a rear tripod which supports the outboard motor in a rear laydown position.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In non-limiting examples disclosed herein, a marine drive is for propelling a marine vessel. The marine drive comprises a propulsor configured to generate a thrust force in a body of water, an electric motor which powers the propulsor, a battery having a battery port for outputting battery power, and a supporting frame which supports the marine drive relative to marine vessel, the supporting frame having a frame interior which retains the battery. A cowling is on the supporting frame, the cowling having a first cowl portion and a second cowl portion which is movable relative to the first cowl portion into a closed position enclosing the supporting frame and the battery in a cowling interior and alternately into an open position providing access to the cowling interior enabling insertion and removal of the battery.

In non-limiting examples disclosed herein, the first cowl portion comprises a cowl body disposed on the front, the back, the port side and the starboard side of the supporting frame and the second cowl portion comprises a lid located on the top of the supporting frame. The lid is movable relative to the cowl body into and between the closed position and the open position. The lid comprises a front end that is latched to the supporting frame by a latch and a rear end that is pivotally coupled to the supporting frame by a hinge.

BRIEF DESCRIPTION OF THE DRAWINGS

Examples are described with reference to the following drawing figures. The same numbers are used throughout to reference like features and components.

FIG. 7 is a view of the interior of a rear cowl panel for the marine drive.

FIG. 8 is a view of the interior of a front top cowl panel for the marine drive.

FIG. 9 is a view of the interior of a front bottom cowl panel for the marine drive.

DETAILED DISCLOSURE

In the present description, certain terms have been used for brevity, clarity, and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

Figure 1:
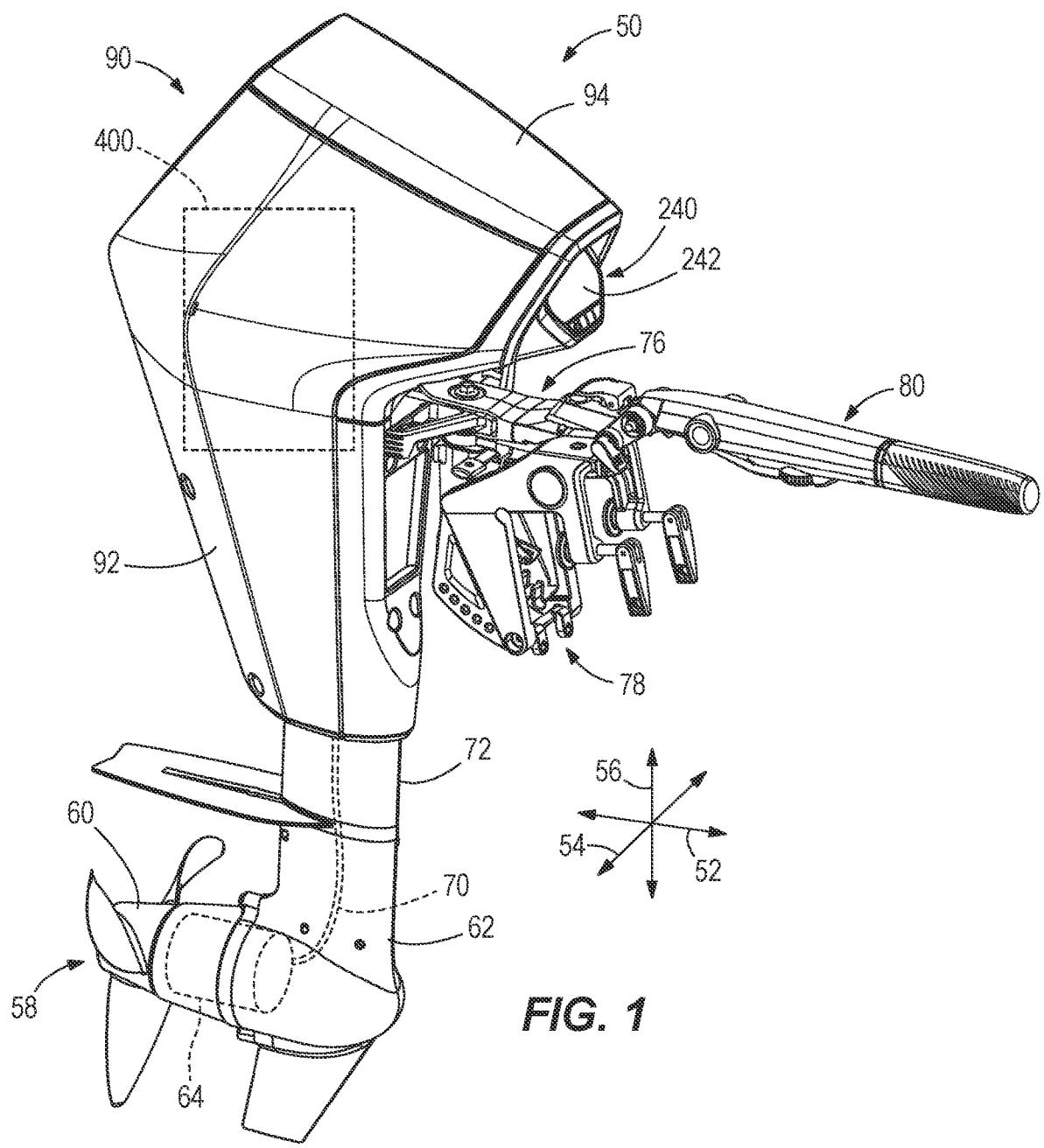
FIG. 1 is a starboard side perspective view of a marine drive according to the present disclosure.
Figure 2:
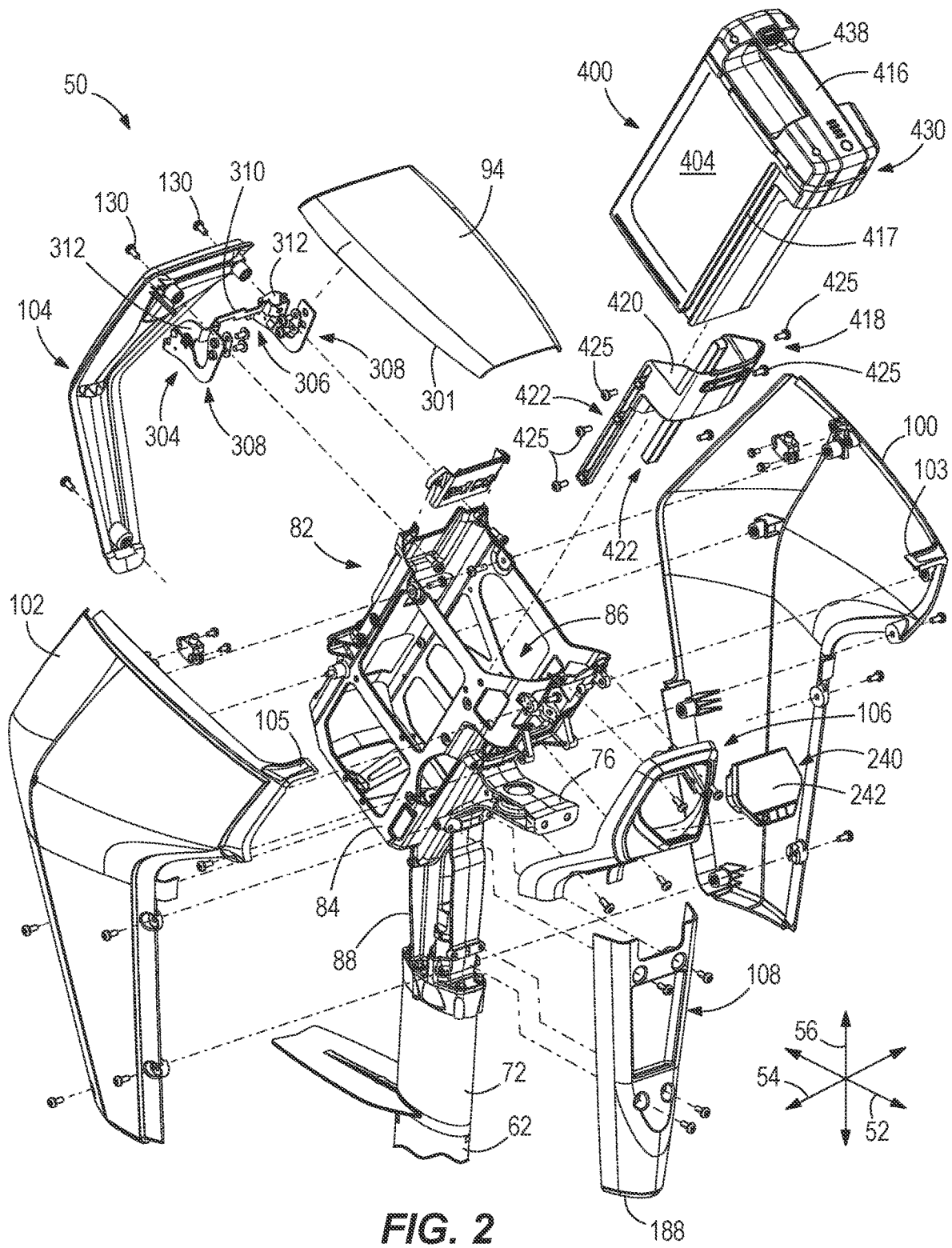
FIG. 2 is a starboard side exploded view of the marine drive.

FIGS. 1 and 2 illustrate a marine drive 50 according to the present disclosure. In the illustrated embodiment the marine drive 50 is an outboard motor, however many of the inventive concepts described herein below are not limited for use with outboard motors. In other embodiments the marine drive 50 could be a stern drive, pod drive, inboard/outboard drive and/or the like. In the illustrated example, the marine drive 50 extends from front to rear in a longitudinal direction 52, from port side to starboard side in a lateral direction 54 that is perpendicular to the longitudinal direction 52, and from top to bottom in an axial direction 56 that is perpendicular to the longitudinal direction 52 and perpendicular to the lateral direction 54. The marine drive 50 has a propulsor 58, which in the illustrated example includes a propeller 60 configured to generate a thrust force for propelling a marine vessel in the surrounding body water, as is conventional. The type and configuration of the propulsor 58 can vary from what is illustrated and described, and in other examples can include more than one propeller, and/or one or more impellers, and/or the like. In the illustrated example, the propulsor 58 extends from the rear of the gearcase or lower unit 62 of the marine drive 50, however in other examples the propulsor 58 can extend from the front of the lower unit 62 in a pulling- or tractor-type arrangement. In use, the lower unit 62 remains stationary relative to the rest of the marine drive 50, however in other examples the lower unit 62 and propulsor 58 could be steerable relative to the rest of the marine drive 50, for example about an axially extending steering axis. Other configurations are contemplated and are possible within the scope of the present disclosure.

The marine drive 50 has an electric motor 64 located in the lower unit 62 and configured to cause rotation of a propeller shaft supporting the propeller 60. The type and configuration of the electric motor 64 can vary, and non-limiting examples includes an axial flux motor, a radial flux motor, or a transverse flux motor, such as those produced by Electric Torque Machines of Flagstaff, Arizona (a Graco Company).

The marine drive 50 also has a battery 400, which will be further described herein below. The battery 400 provides battery power to the electric motor 64 via electrical wires 70 extending into the lower unit 62 via a strut 72. The battery 400 is further illustrated and described herein below with reference to FIGS. 29-36.

The marine drive 50 is configured to be attached to the marine vessel by a steering arm 76 and a transom bracket 78. The transom bracket 78 is clamped to the marine vessel in a conventional manner and facilitates steering of the marine drive 50 relative to the marine vessel about a steering axis, and trim of the marine drive 50 relative to the marine vessel about a trim axis. A tiller arm 80 is mounted on the outer end of the steering arm 76 and configured for steering by the operator of the marine drive 50 while situated in the marine vessel.

Figure 3:
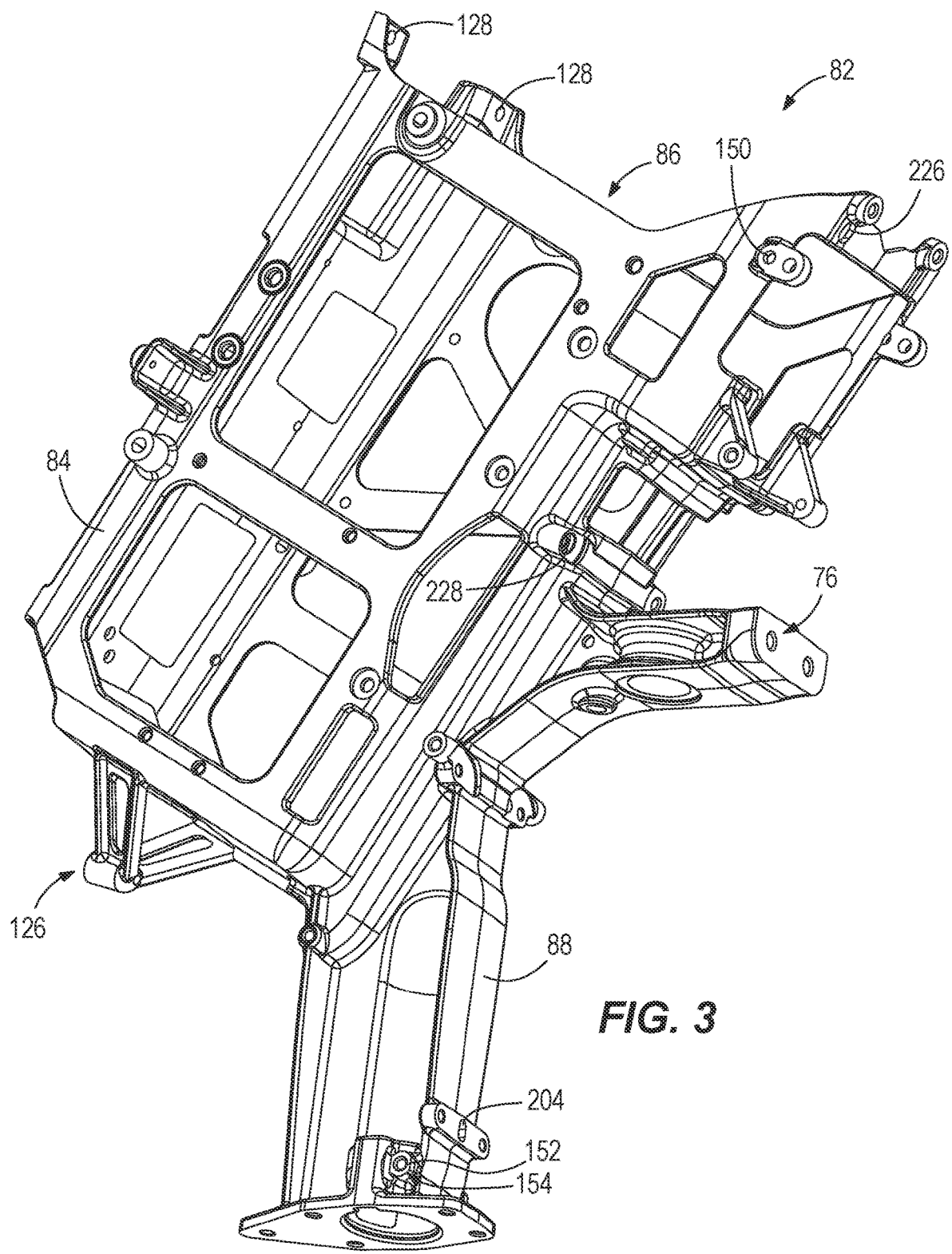
FIG. 3 is a starboard side perspective view of a supporting frame for the marine drive.
Figure 4:
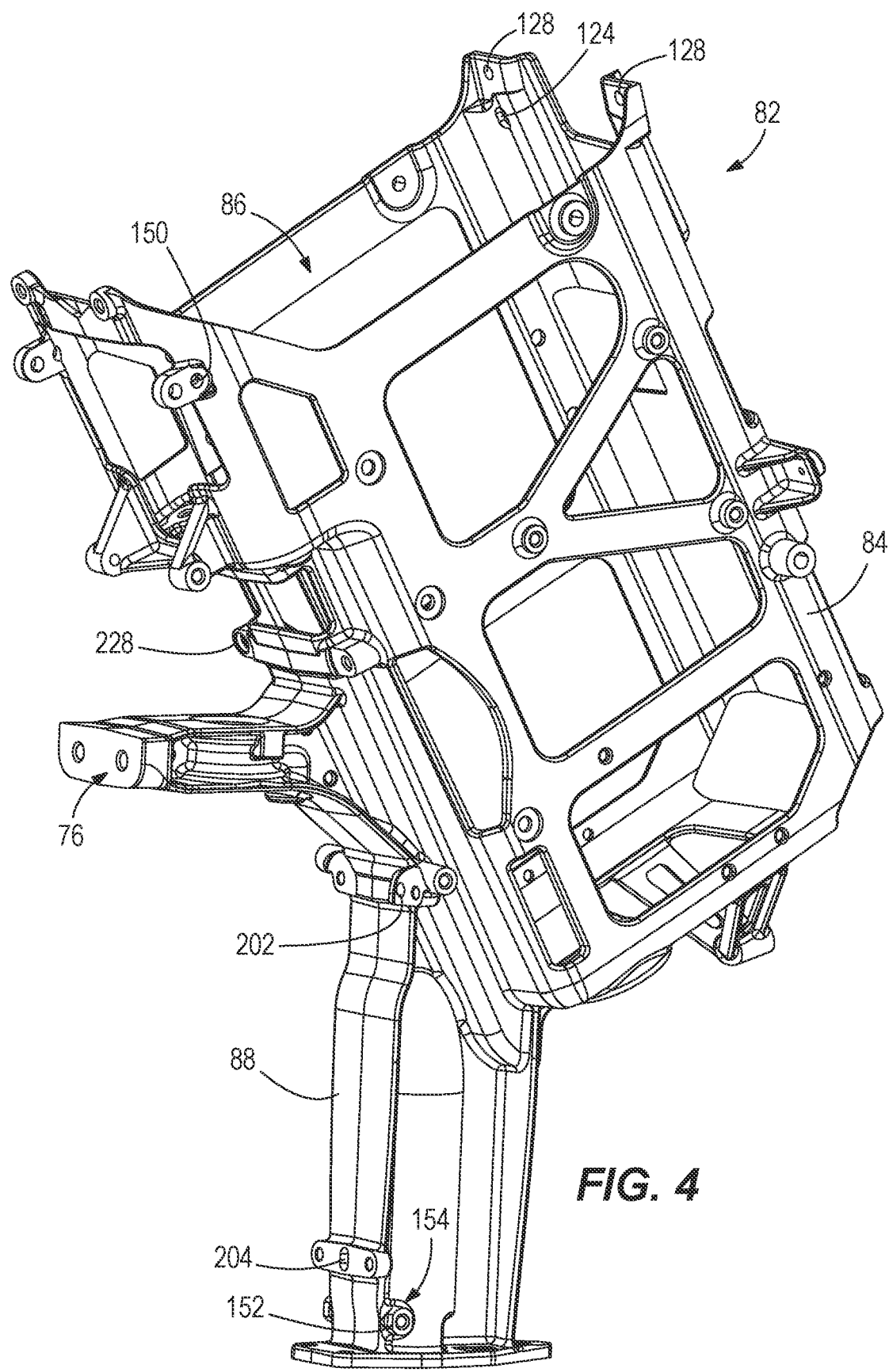
FIG. 4 is a port side perspective view of the supporting frame.

Referring to FIGS. 2-4, the marine drive 50 has a novel supporting frame 82 for supporting various components of the marine drive 50 and for supporting the entire marine drive 50 relative to the marine vessel. The supporting frame 82 extends from a front to a rear in the longitudinal direction 52, from port side to starboard side in the lateral direction 54, and from top to bottom in the axial direction 56. In a preferred embodiment, the supporting frame 82 is a monolithic component having a monolithic body 84 that defines a frame interior 86 for supporting the noted battery 400, as will be further explained herein below. The supporting frame 82 further has a support leg 88 which is integrally formed with and extends downwardly from the monolithic body 84. The support leg 88 is fastened to the strut 72, as illustrated. The supporting frame 82 also includes a portion of the noted steering arm 76 which is integrally formed with and extends forwardly from the monolithic body 84. The steering arm 76 is coupled to the transom bracket 78 and the tiller arm 80.

Figure 10:
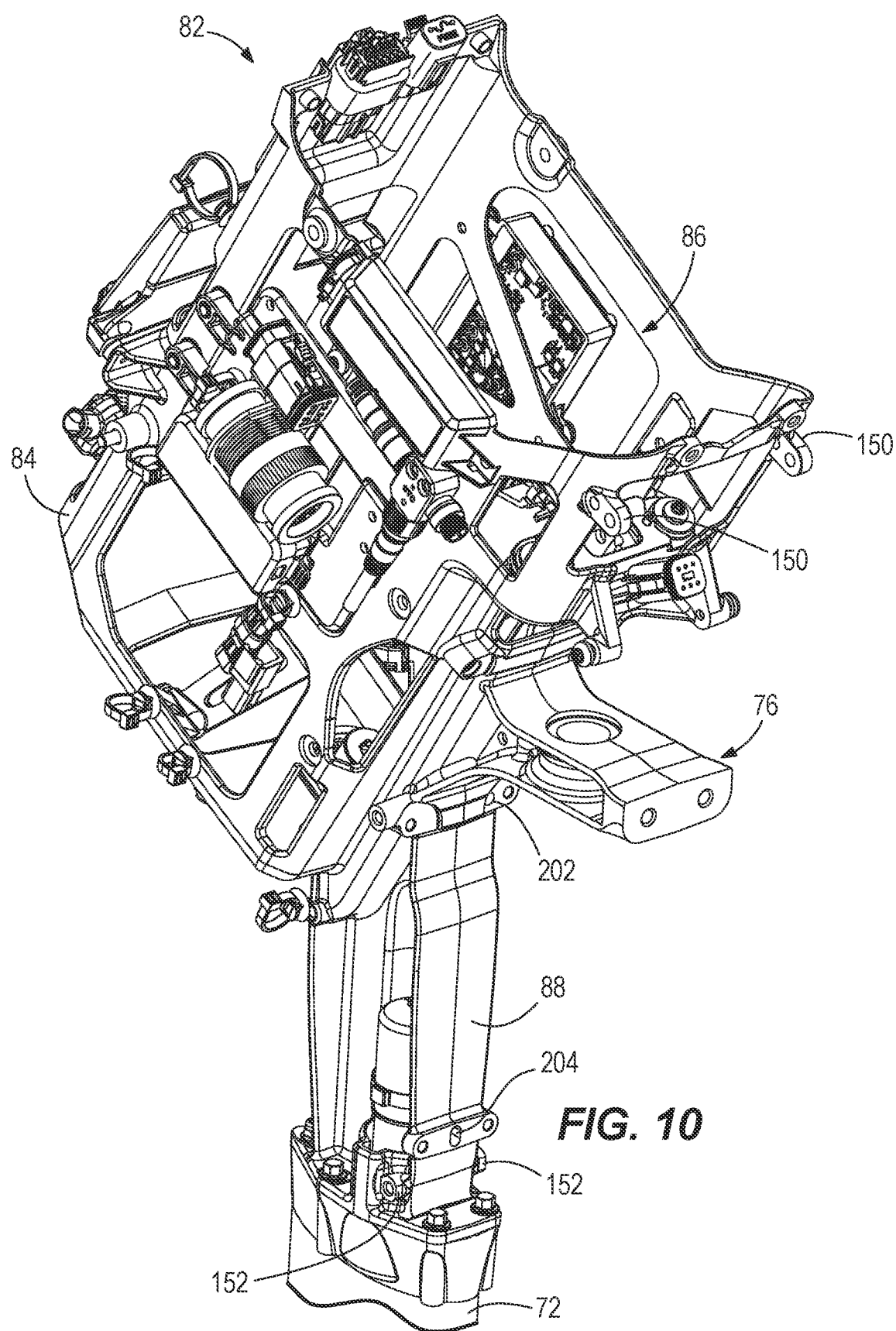
FIG. 10 is starboard side perspective view of a supporting frame of the marine drive, illustrating various accessory components mounted thereon.
Figure 11:
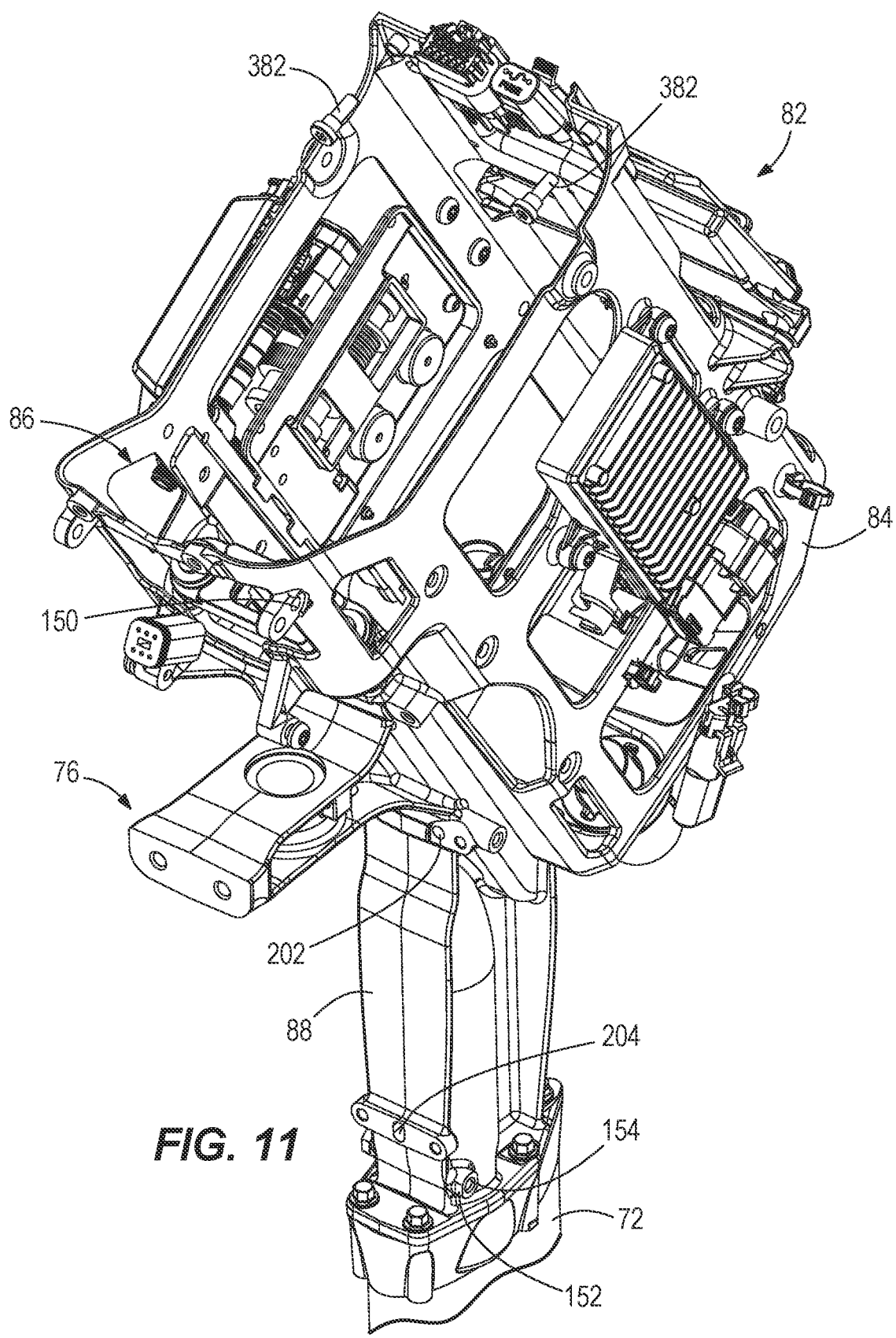
FIG. 11 is a port side perspective view of the supporting frame, illustrating various accessory components mounted thereon.
Figure 12:
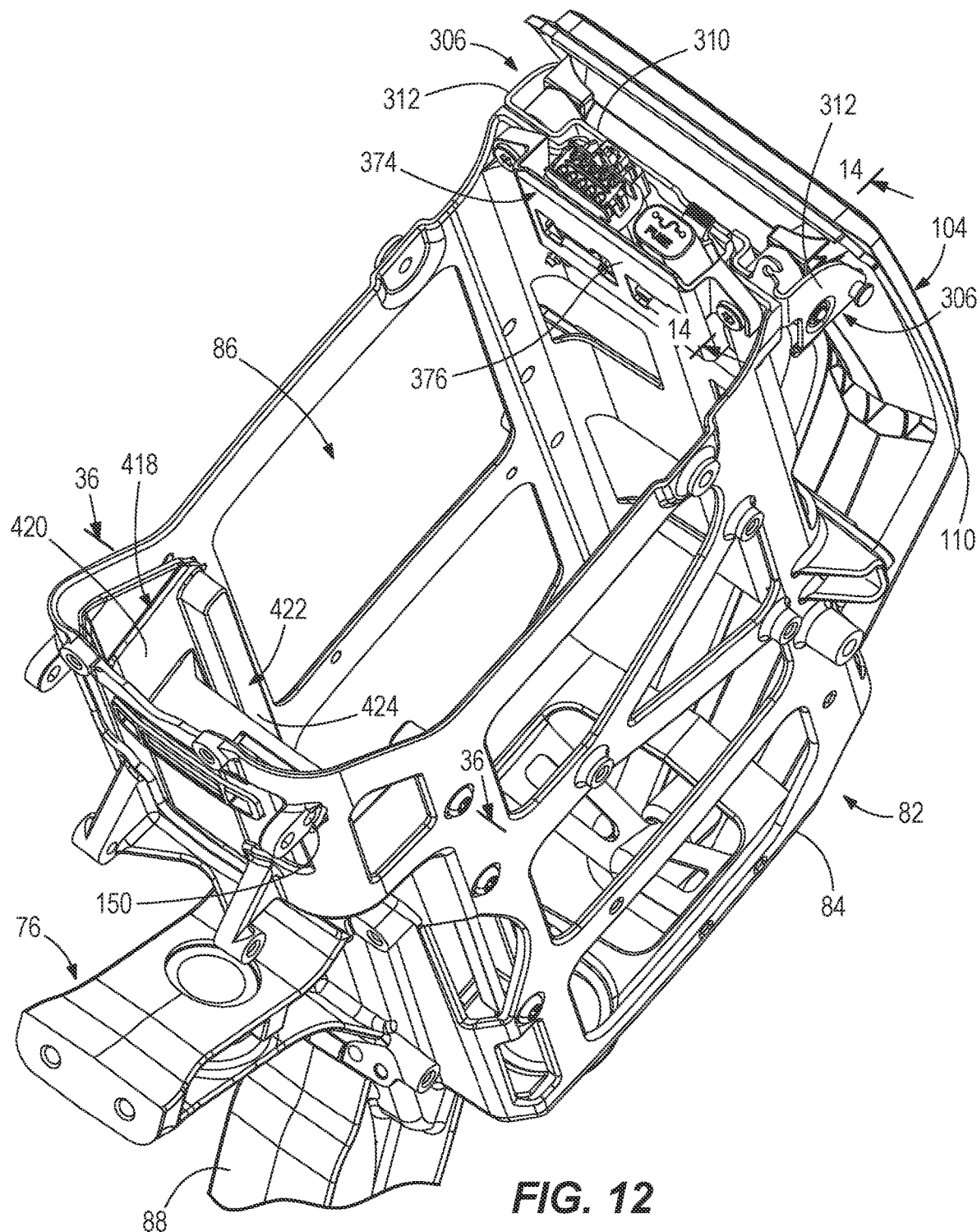
FIG. 12 is a perspective view looking down into a frame interior of the supporting frame.

FIGS. 10 and 11 illustrate the supporting frame 82 during initial stages of an assembly process for the marine drive 50. As illustrated, the sides, front, rear, and bottom of the monolithic body 84 define a trusswork on which various accessory components of the marine drive 50 are mounted via fasteners, including for example screws, ties, and/or the like. Examples of the accessory components which are mounted to the trusswork include electrical wiring, electrical wiring harnesses, DC converters, printed circuit boards, fuses, and/or various other accessory components for the marine drive 50. The components illustrated in FIGS. 10 and 11 are typically installed during the initial stages of the assembly process, and particularly prior to mounting of various cowling components, which will be further described herein below. The components can be installed during latter stages of the assembly process.

Referring back to FIGS. 1 and 2, a cowling 90 is mounted on the supporting frame 82. The cowling 90 encloses the frame interior 86 and covers various components mounted to the trusswork. The cowling 90 also encloses the battery 400 located in the frame interior 86. The monolithic body 84 of the supporting frame 82 is itself is located inside of a cowling interior 300 defined by the cowling 90, as will be further described herein below with reference to FIGS. 29-36. The type and configuration of the cowling 90 can vary from what is shown and described, and for example can include one or more portions that are mounted to the supporting frame 82. In general, the cowling 90 includes a first cowl portion consisting of a cowl body 92 on the supporting frame 82 and a second cowl portion consisting of a lid 94 located on the top of the cowl body 92. The second cowl portion or lid 94 is movable relative to the first cowl portion or cowl body 92 into and between the closed position illustrated in FIG. 1, and an open position (illustrated in FIG. 28) exposing and providing access to the frame interior 86 and the cowling interior 300, as will be further described herein below. In the illustrated embodiment, the cowl body 92 is located on the front, the back, the port side and the starboard side of the supporting frame 82, and the lid 94 is located on the top of the supporting frame 82.

Referring to FIGS. 2 and 5-7, the cowl body 92 includes a plurality of cowl panels, including a port side cowl panel 100 (FIG. 5), a starboard side cowl panel 102 (FIG. 6), a rear cowl panel 104 (FIG. 7), an upper front cowl panel 106 (FIG. 8), and a lower front cowl panel 108 (FIG. 9). In other examples, instead of comprising multiple panels, the cowl body 92 could wrap around the supporting frame 82.

Referring to FIG. 7, the rear cowl panel 104 is a generally angular, plate-like member having an outer perimeter 110. Mounting bosses protrude from the interior surface of the rear cowl panel 104. In particular, port and starboard mounting bosses 112 are located along the top of the rear cowl panel 104 and a center mounting boss 114 is located along the bottom of the rear cowl panel 104. Each of the mounting bosses 112, 114 has a through-bore formed therethrough for retaining a fastener inserted from outside of the rear cowl panel 104, as will be further described herein below. The rear cowl panel 104 also has a locating device 116, which as will be further explained herein below is for initially locating the rear cowl panel 104 on the supporting frame 82 during installation thereof. The locating device 116 includes a dowel pin 120, which in the illustrated example is an elongated cross-pin located adjacent the starboard-side mounting boss 112, along the top side of the rear cowl panel 104, and protruding outwardly from the interior surface of the rear cowl panel 104. The rear cowl panel 104 also has an orienting device 118 for subsequently rotationally orienting the rear cowl panel 104 relative to the supporting frame 82 during installation. The orienting device 118 includes an annular protrusion 122 extending around the through-bore in the center mounting boss 114.

The rear cowl panel 104 is the first of the plurality of cowl panels to be installed on the supporting frame 82. The locating device 116 and orienting device 118 advantageously facilitate efficient and accurate installation of the rear cowl panel 104 onto the rear of the supporting frame 82, as follows. Referring to FIGS. 2, 4, 7 and 12, a technician and/or other person brings the rear cowl panel 104 to the rear of the supporting frame 82 (see dash-and-dot lines in FIG. 2) such that the dowel pin 120 is partially inserted into a dowel hole 124 (which is shown in FIG. 4) on the rear of the supporting frame 82. The dowel pin 120 is freely rotatable in the dowel hole 124, which allows the technician to subsequently rotate the rear cowl panel 104 about the axis defined by the dowel pin 120 until the annular protrusion 122 is aligned with a corresponding countersunk threaded bore 126 (which is shown in FIG. 4) on the rear of the supporting frame 82. Once properly aligned, (see FIG. 12) the technician is able to move the rear cowl panel 104 further towards the rear of the supporting frame 82 such that the dowel pin 120 is fully inserted into the dowel hole 124 and the annular protrusion 122 is fully engaged with the corresponding countersunk threaded bore 126. This automatically aligns each of the port and starboard mounting bosses 112 with corresponding threaded holes 128 (shown in FIG. 4) on along the top of the rear of the supporting frame 82. Thereafter, fasteners 130 (shown in FIG. 2) are inserted through the rear cowl panel 104, via the mounting bosses 112, 114 and into threaded engagement with the rear of the supporting frame 82.

Figure 5:
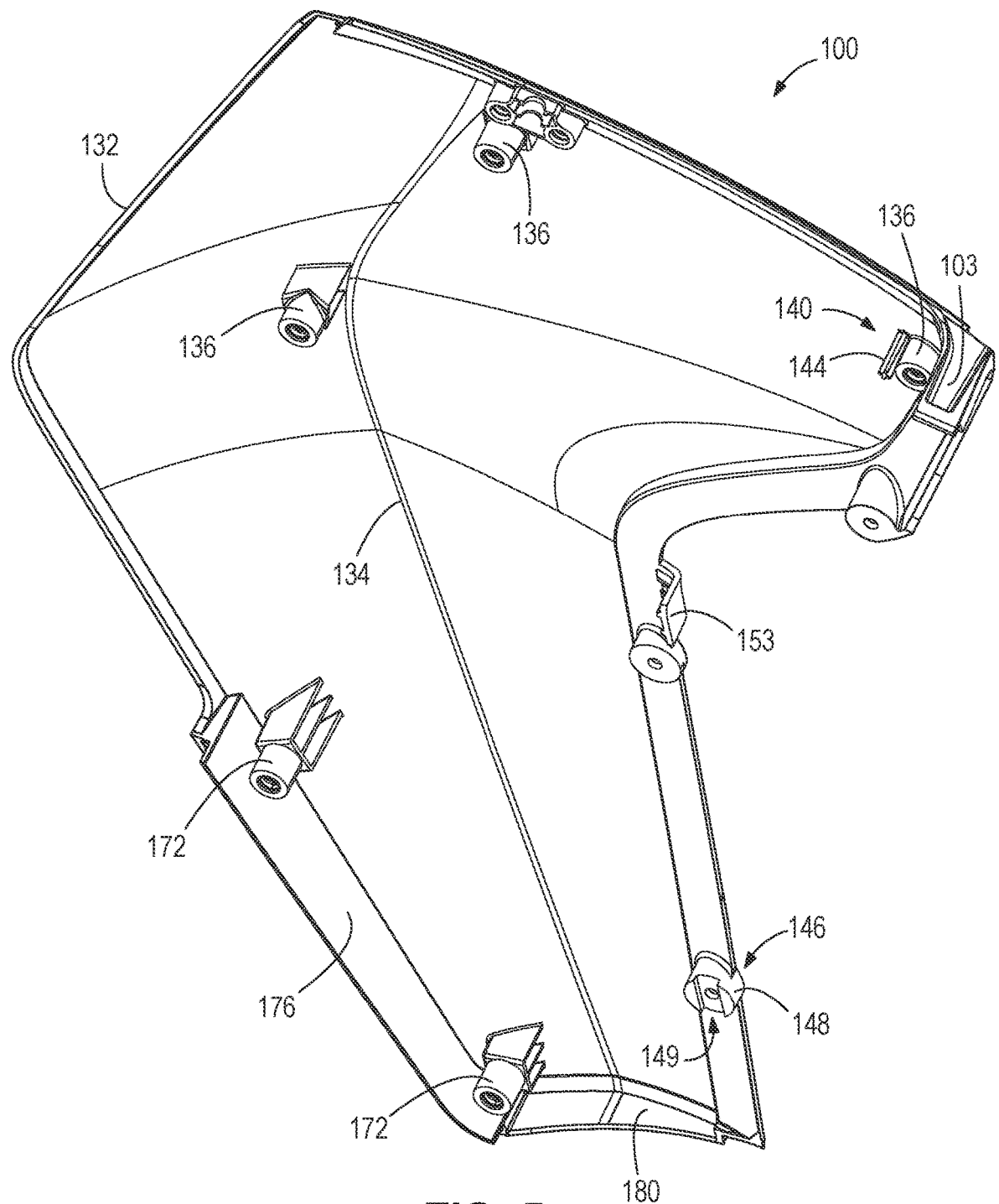
FIG. 5 is view of the interior of a port side cowl panel for the marine drive.
Figure 6:
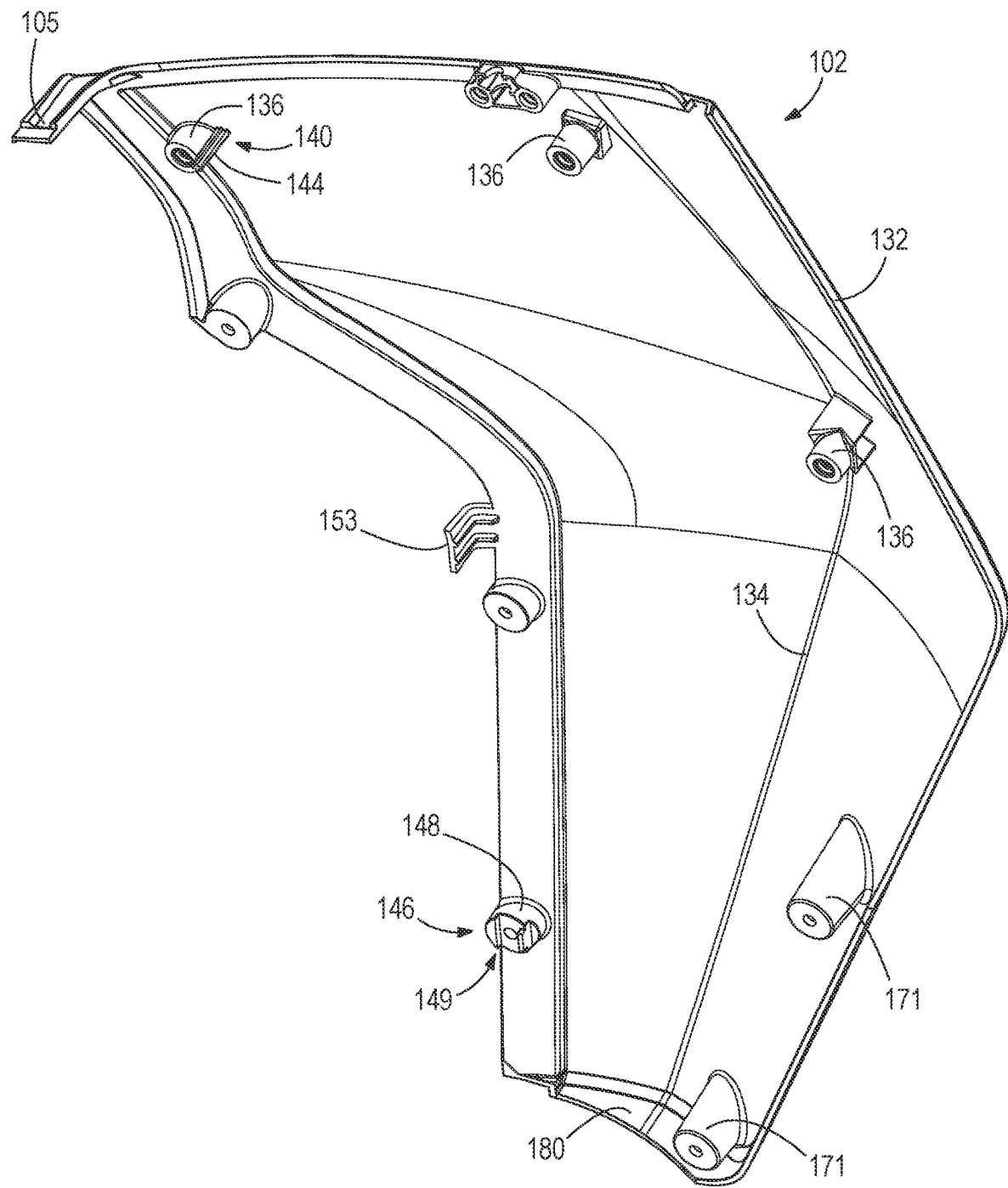
FIG. 6 is a view of the interior of a starboard side cowl panel for the marine drive.

Referring now to FIGS. 5 and 6, the port side cowl panel 100 and the starboard side cowl panels 102 are the next of the plurality of cowl panels to be installed on the supporting frame 82. The port side cowl panel 100 and the starboard side cowl panel 102 are nearly mirror images of each other with only a few differences. Thus the following description of the nature of an installation of the port side cowl panel 100 for the most part applies to the starboard side cowl panel 102. Like reference numbers are illustrated in the drawings. The port side cowl panel 100 is a generally flat member having a perimeter 132 extending entirely around the port side cowl panel 100. An arc-shaped split contour line 134 extends from the top to the bottom through the middle of the port side cowl panel 100. Various contoured panel sections are located on either side of the arc-shaped split contour line 134. A plurality of mounting bosses 136 protrude from the upper portion of the interior surface of the port side cowl panel 100, each having threaded bores formed therein for engagement by a hidden fastener that couples the port side cowl panel 100 to the supporting frame 82, as will be further described herein below. The port side cowl panel 100 also has a locating device 140, which as will be further explained herein below is for initially locating the port side cowl panel 100 on side of the supporting frame 82 during installation thereof. The locating device 140 includes a dowel pin 144, which in the illustrated example is an elongated cross-pin located at the front side of the port side cowl, alongside the perimeter 132 and alongside one of the mounting bosses 136. The port side cowl panel 100 also has an orienting device 146 for subsequently rotationally orienting the port side cowl panel 100 relative to the supporting frame 82 during installation. The orienting device 146 is a slotted boss 148 which is cylindrically shaped and has an axially-oriented slot 149 formed in its end face. The slotted boss 148 has a bore for receiving a fastener, as will be explained herein below. The slotted boss 148 is located along the lower front of the port side cowl panel 100, alongside the perimeter 132.

The locating device 140 and orienting device 146 advantageously facilitate efficient and accurate installation of the port side cowl panel 100 and the starboard side cowl panel 102 onto the port and starboard sides of the supporting frame 82, as follows. Referring now to FIGS. 15-18, the technician brings the port side cowl panel 100 to the port side of the supporting frame 82 and partially inserts the dowel pin 144 into a dowel hole 150 on the top of the port side of the supporting frame 82 (see FIGS. 17-18). The dowel pin 144 is freely rotatable within the dowel hole 150, which allows the technician to rotate the port side cowl panel 100 relative to the port side of the supporting frame 82 until the slotted boss 148 is aligned with opposed flats 152 on opposite side of a mounting boss 154 located on the lower end of the support leg 88 (see FIGS. 15-16). An elbow flange 153 (see FIG. 5) on the forward side of the perimeter 132 facilitates easy alignment via engagement with the front of the supporting frame 82. Next the technician presses the port side cowl panel 100 further onto the port side of the supporting frame 82 so as to fully insert the dowel pin 144 into the dowel hole 150 and so as to fully engage the slotted boss 148 with the opposed flats 152 on the mounting boss 154. (See FIG. 15). This advantageously automatically aligns the various mounting bosses 136 with bores on the supporting frame 82. Thereafter, referring to FIG. 18, the technician reaches into the frame interior 86 from the top of the supporting frame 82 and installs fasteners 158 through the bores and into threaded engagement with the mounting bosses 136. The fasteners 158 are thus advantageously hidden from view exterior of the marine drive 50 and thus are referred to herein as "hidden fasteners". Next, with continued reference to FIG. 18, the technician brings the starboard side cowl panel 102 to the starboard side of the supporting frame 82 and partially inserts the dowel pin 144 into a dowel hole 150 on the top of the port side of the supporting frame 82, and continues installing the starboard side cowl panel 102 by repeating the steps described herein above regarding the port side cowl panel 100.

Figure 16:
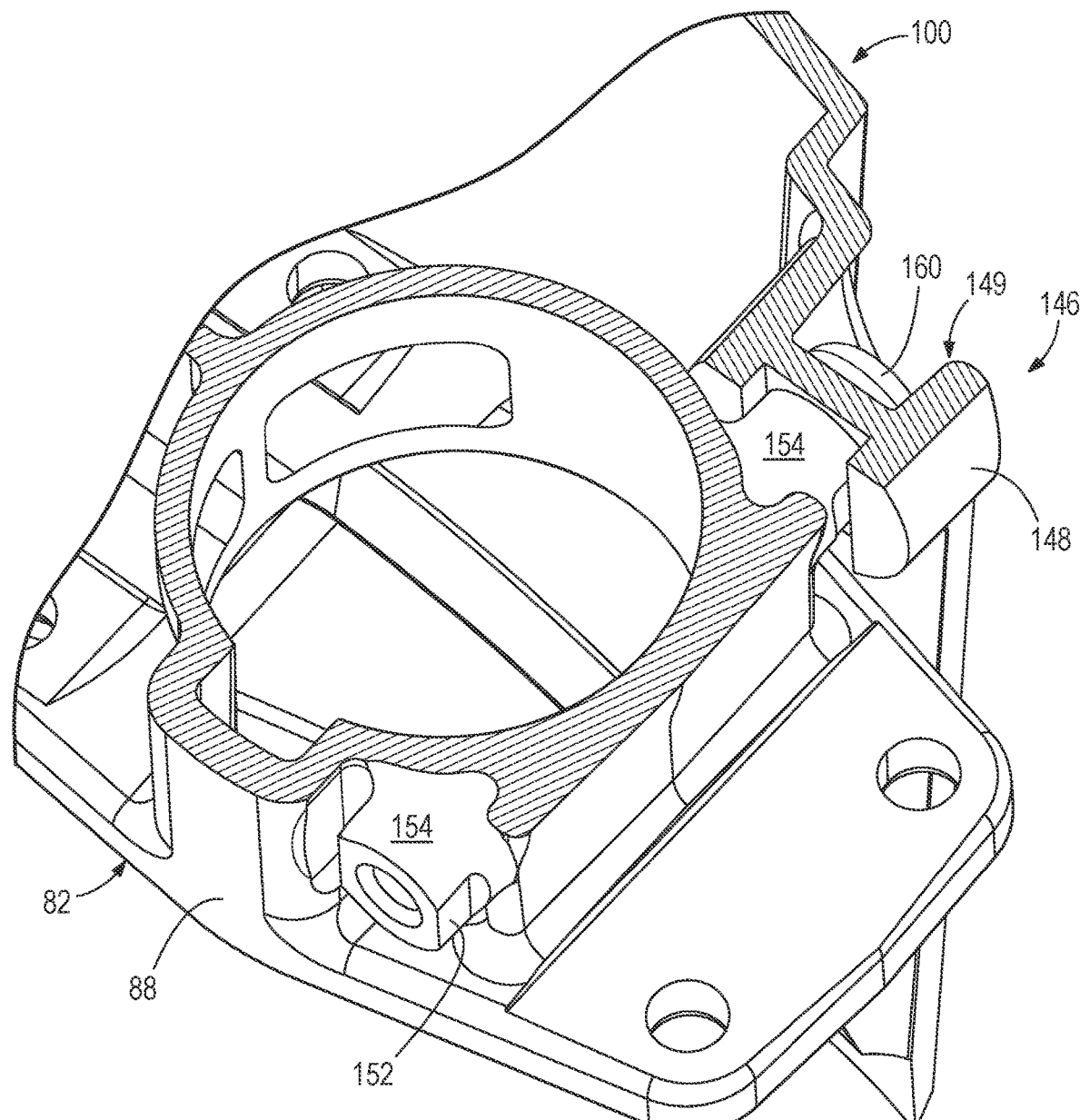
FIG. 16 is a view of section 16-16, taken in FIG. 15.
Figure 17:
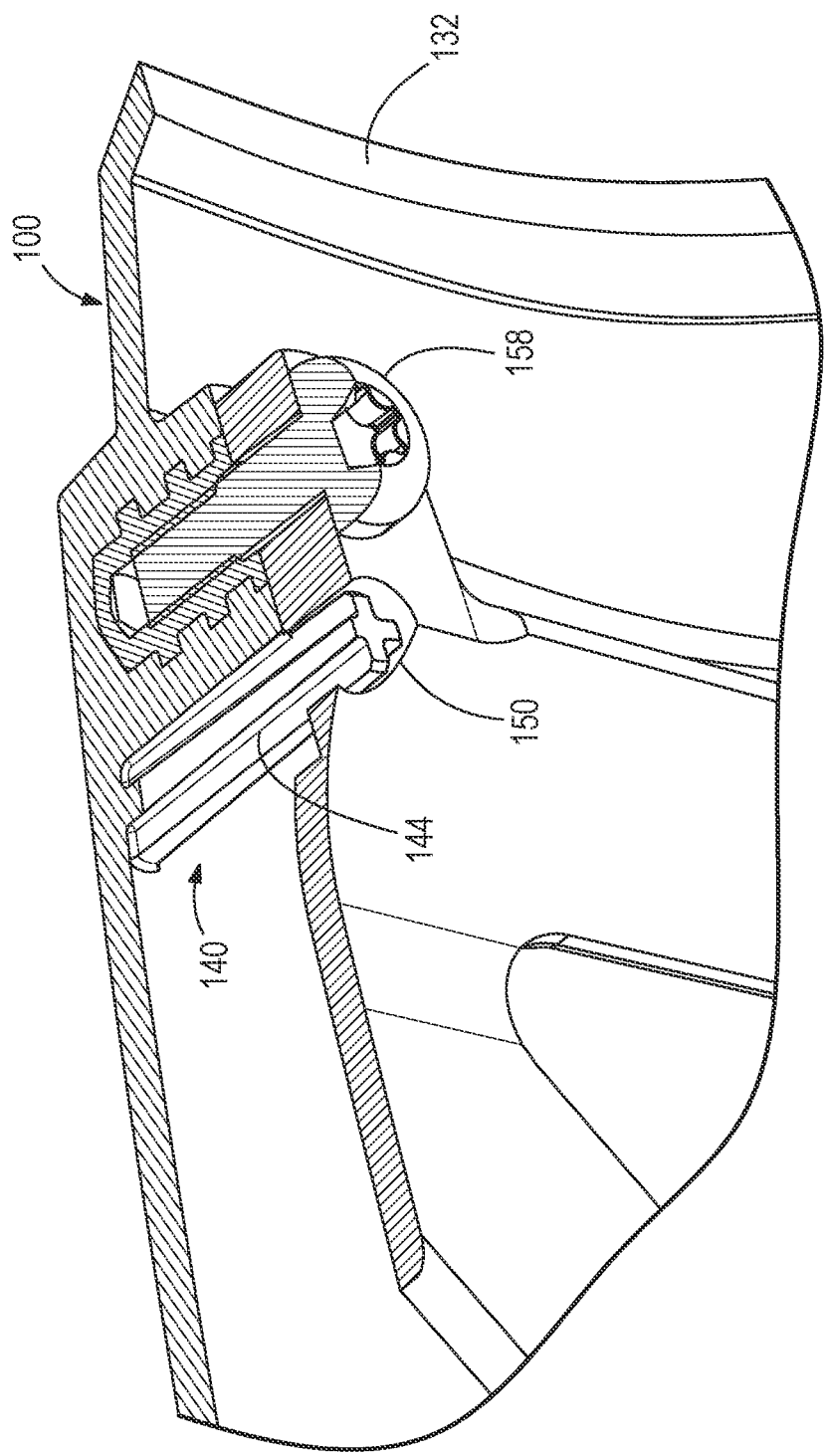
FIG. 17 is a view of section 17-17, taken in FIG. 15.
Figure 18:
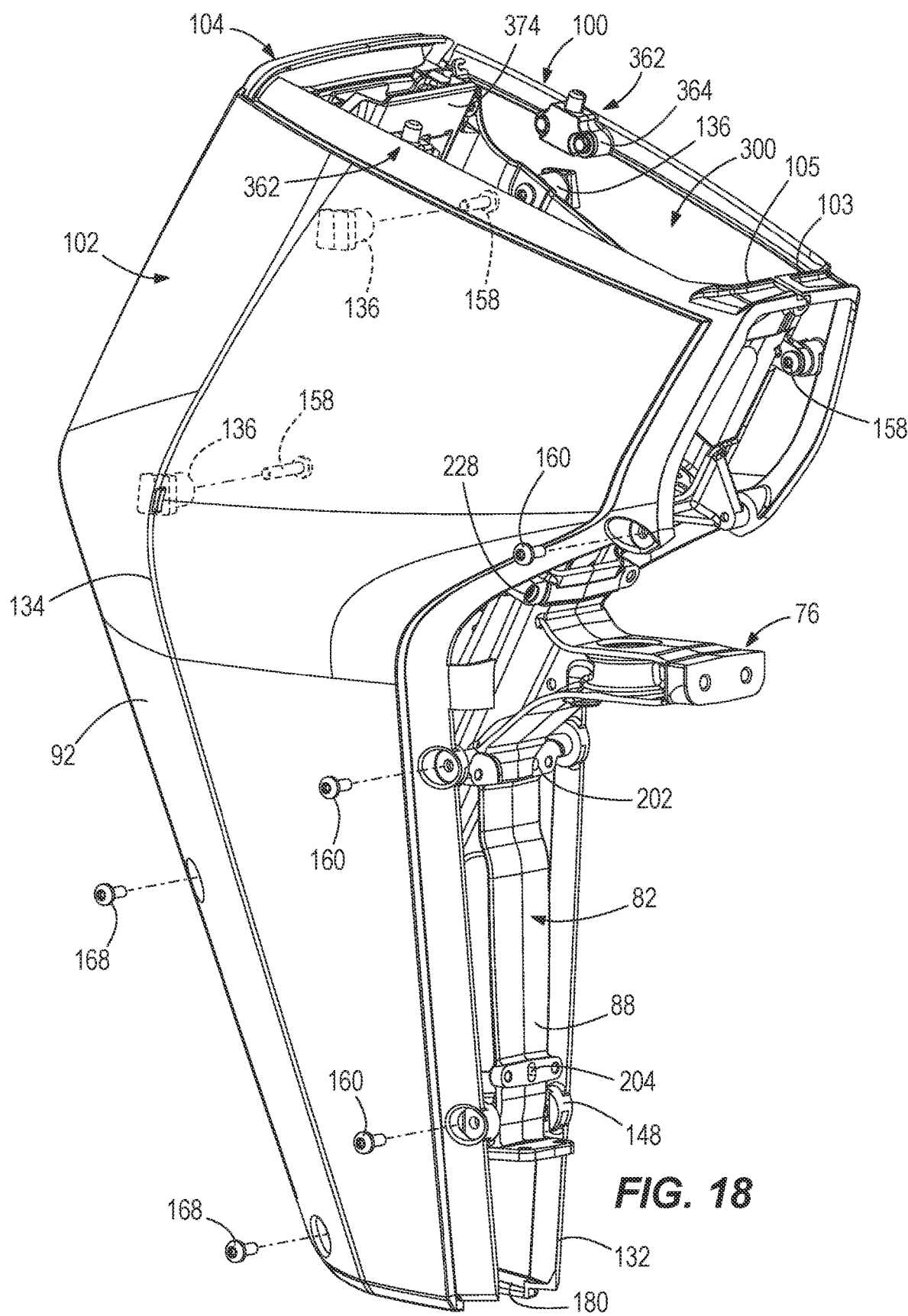
FIG. 18 is a starboard-side perspective view of the supporting frame having the rear cowl panel, the port side cowl panel, and the starboard side cowl panel mounted thereon.

Referring to FIGS. 16 and 18, once the port side cowl panel 100 and the starboard side cowl panel 102 are fastened to the supporting frame 82 via the hidden fasteners 158, the technician inserts fasteners 160 through mounting bosses 162 and into engagement with corresponding opposed threaded bores on the upper portion of the support leg 88 and through the slotted boss 148 and into engagement with corresponding opposed threaded bores on the lower portion of the support leg 88. Referring to FIG. 18, the technician also inserts two externally visible fasteners 168 through bosses 171 located along the rear of the starboard side cowl panel 102 and into threaded engagement with threaded bores formed in mounting bosses 172 extending from the interior surface of the port side cowl panel 100, along the rear thereof. Thus, the port side cowl panel 100 and the starboard side cowl panel 102 are fastened together along their rear sides via fasteners 168.

Figure 15:
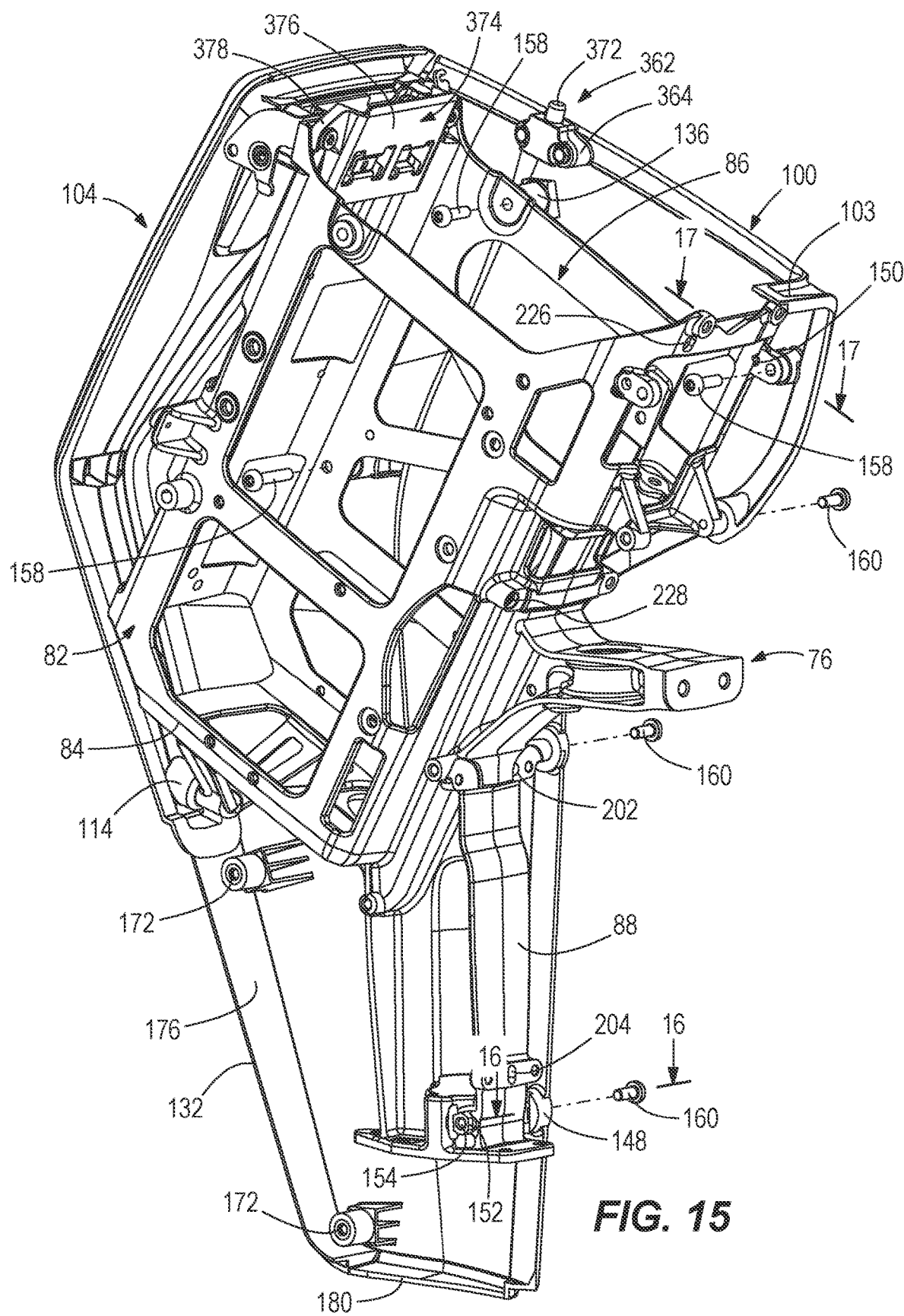
FIG. 15 is a starboard-side perspective view of the supporting frame having the rear cowl panel and the port side cowl panel mounted thereon.

Referring now to FIGS. 5 and 15, along the rear side of the cowl body 92, particularly along the lower portion thereof, the port side cowl panel 100 has a lip 176, which as illustrated in FIG. 15 overlaps the outer perimeter 110 on the bottom of the rear cowl panel 104 when the port side cowl panel 100 is installed. Installation of the starboard side cowl panel 102 causes its perimeter 132 to overlap the outer perimeter 110 on the bottom of the rear cowl panel 104 and the lip 176 on the port side cowl panel 100. The perimeter 132 of the port side cowl panel 100 and the starboard side cowl panel 102, particularly along the upper rear portions thereof, overlap the perimeter edges of the rear cowl panel 104, particularly along the port and starboard sides thereof. Thus, the rear cowl panel 104 is effectively sandwiched between the perimeter edges of the port and starboard side cowl panels 100, 102, along the rear edges thereof. The bottom of the port side cowl panel 100 and the starboard side cowl panel 102 have an inwardly turned lip 180 which is turned inwardly towards the strut 72.

Next, the upper front cowl panel 106 (see FIG. 8) and the lower front cowl panel 108 see (FIG. 9) are installed.

Figure 22:
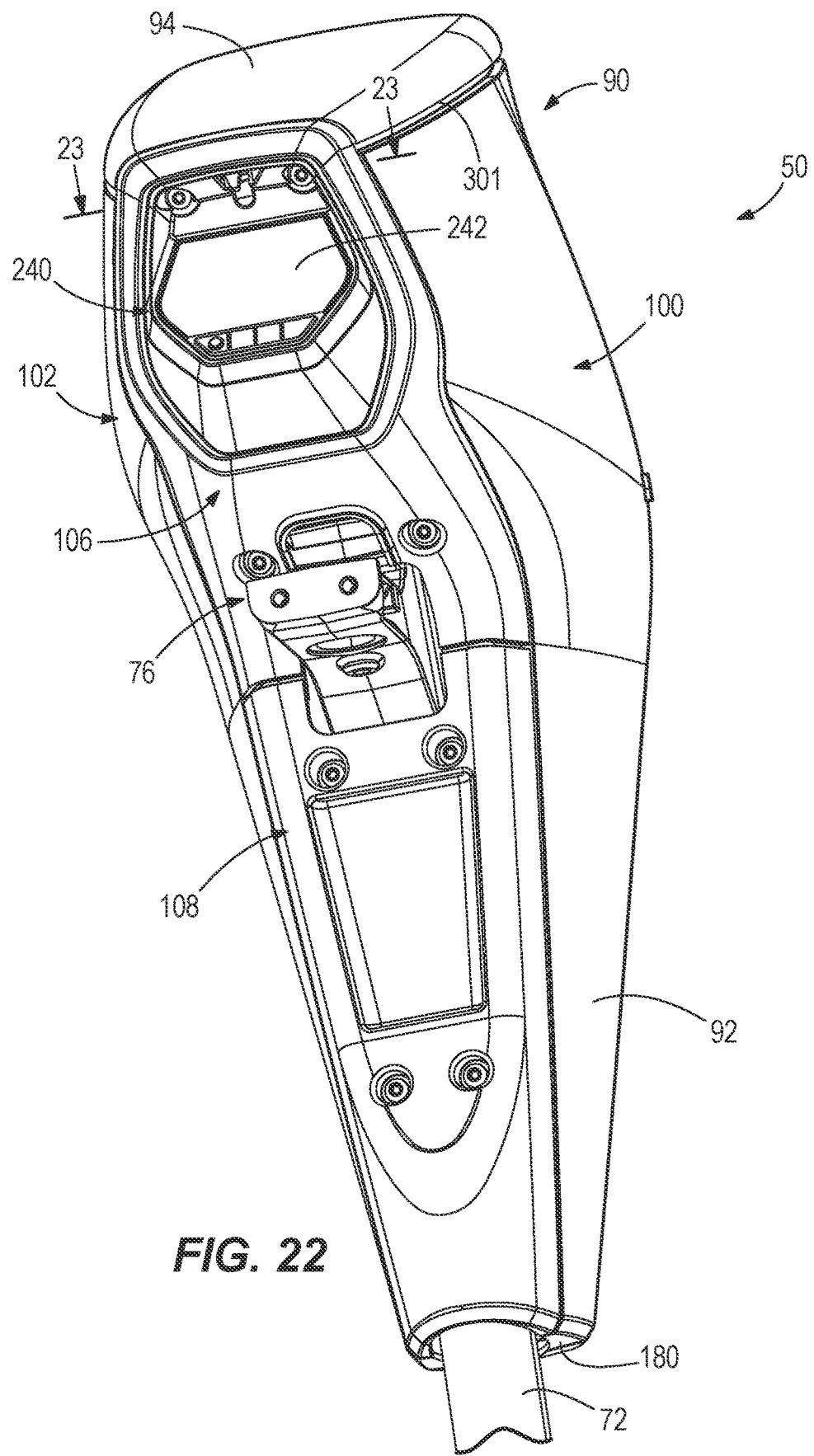
FIG. 22 is a front perspective view of the marine drive, illustrating the upper front cowl panel and lower front cowl panel mounted thereon.

Referring first to FIG. 9, the lower front cowl panel 108 is an elongated plate-like member having a U-shaped cross section. The lower front cowl panel 108 has an outer perimeter consisting of opposing straight side edges 182, a U-shaped top edge 184 which defines a space through which the lower half of the steering arm 76 extends when the lower front cowl panel 108 is installed on the supporting frame 82 (see FIG. 22), and a bottom edge 188 having an inwardly turned lip 190, which together with the inwardly turned lips 180 on the lower rear sides of the port side cowl panel 100 and the starboard side cowl panel 102 surrounds the strut 71 when these components are fully installed (see FIG. 22). Referring to FIG. 9, the lower front cowl panel 108 has four mounting bosses 192, including port and starboard upper mounting bosses and port and starboard lower mounting bosses. The lower front cowl panel 108 also has a locating device 194, which as will be further explained herein below is for initially locating the lower front cowl panel 108 on rear of the supporting frame 82 during installation thereof. The locating device 194 includes a dowel pin 196, which in the illustrated example is an elongated cross-pin located at the top of the lower front cowl panel 108, adjacent the upper port-side mounting boss, and protruding outwardly from the interior surface of the lower front cowl panel 108. The lower front cowl panel 108 also has an orienting device 198 for orienting the lower front cowl panel 108 relative to the supporting frame 82 during installation. The orienting device 198 includes another dowel pin 200, which in the illustrated example is an elongated cross-pin located at the bottom of the lower front cowl panel 108, between the lower port and starboard mounting bosses and protruding outwardly from the interior surface of the lower front cowl panel 108.

Figure 21:
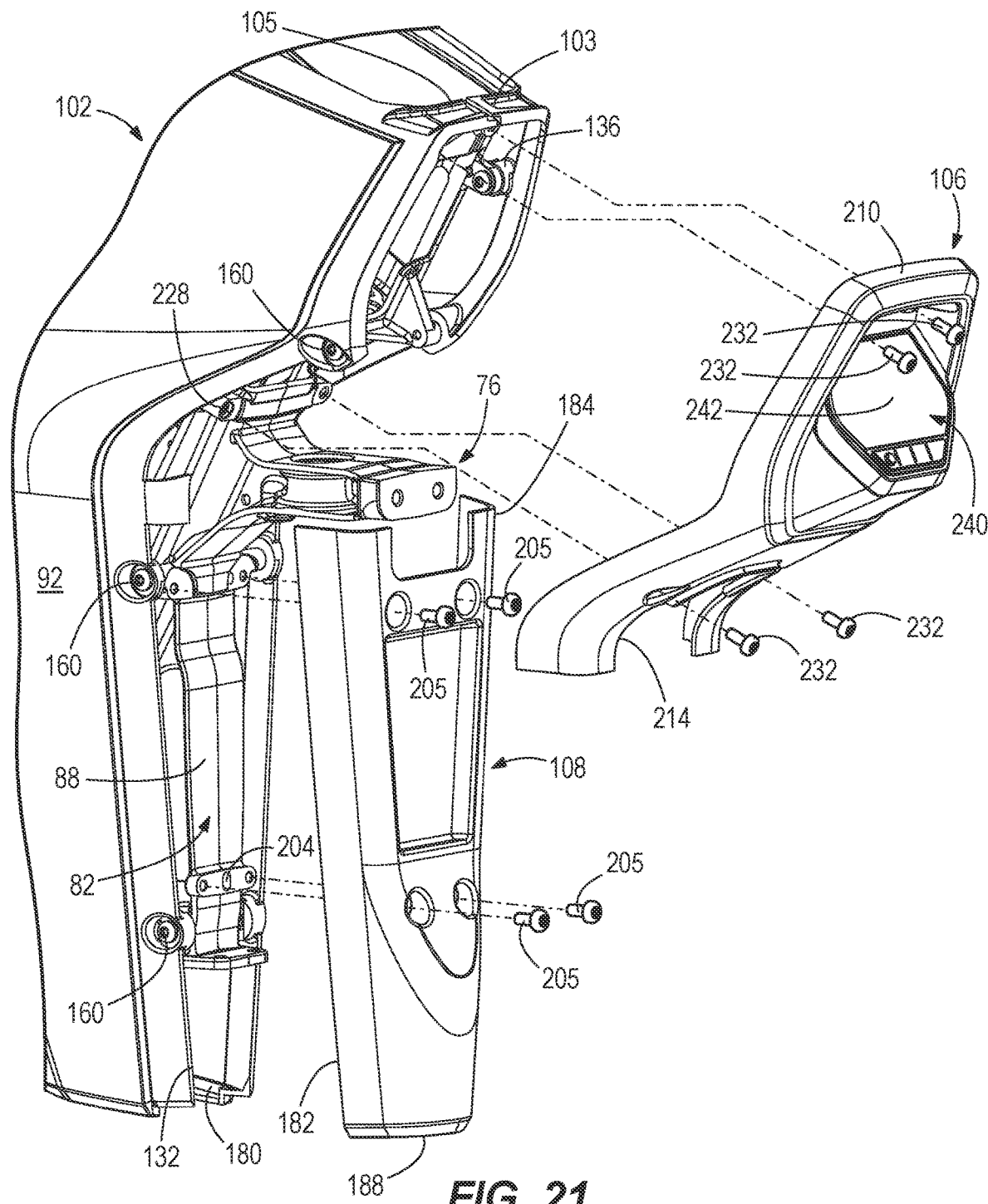
FIG. 21 is an exploded view illustrating the upper front cowl panel and a lower front cowl panel removed from the supporting frame.

The locating device 194 and orienting device 198 advantageously facilitate efficient and accurate installation of the lower front cowl panel 108 onto the lower front side of the supporting frame 82, as follows. Referring to FIGS. 9 and 21, initially the technician brings the lower front cowl panel 108 to the lower front side of the supporting frame 82 and partially inserts the dowel pin 196 into a dowel hole 202 (shown in FIG. 18) on the supporting frame 82. The dowel pin 196 is freely rotatable within the dowel hole 202, which allows the technician to rotate the lower front cowl panel 108 relative to the lower front side of the supporting frame 82 until the dowel pin 200 is aligned with an elongated dowel slot 204 (shown in FIG. 18) on the lower end of the support leg 88. The elongated nature of the dowel slot 204 provides freedom of movement during this process. Next the technician presses the lower front cowl panel 108 onto the lower front side of the supporting frame 82, in the direction of the dash-and-dot lines in FIG. 21, which fully inserts the dowels pins 196, 200 into the dowel hole 150 and dowel slot 204, respectively. This advantageously automatically aligns the various mounting bosses 192 with corresponding threaded bores on the supporting frame 82. Thereafter, the technician installs externally visible fasteners 205 through bores extending through the mounting bosses 192 and into engagement with the respective threaded bores on the supporting frame 82 so as to fixedly mount the lower front cowl panel 108 onto the supporting frame 82. In the mounted position, the opposing straight side edges 182 overlap the perimeter 132 of the port and starboard side cowl panels 100, 102, along the lower forward sides thereof, advantageously covering the fasteners 160, hiding them from view and thus rendering the fasteners 160 "hidden fasteners".

Now referring to FIGS. 8 and 21, installation of the upper front cowl panel 106 will be described. The upper front cowl panel 106 is an angular, plate-like member having a perimeter edge 210 that is inwardly turned so that the perimeter edge 201 overlaps the perimeter 132 on the upper forward sides of the port and starboard side cowl panels 100, 102 when the upper front cowl panel 106 is installed, thus hiding fasteners 160. Upper front cowl panel 108 has a U-shaped bottom edge 214 which defines a space through which the upper half of the steering arm 76 extends when the upper front cowl panel 106 is installed on the supporting frame 82 (see FIG. 22). Referring to FIG. 8, the upper front cowl panel 106 has four mounting bosses 216 including port and starboard upper mounting bosses and port and starboard lower mounting bosses, each having a through-bore for receiving a fastener. The upper front cowl panel 106 also has a locating device 218, which as will be further explained herein below is for initially locating the upper front cowl panel 106 on front of the supporting frame 82 during installation thereof. The locating device 218 includes a dowel pin 220, which in the illustrated example is an elongated cylindrical pin located below the upper starboard-side mounting boss, and protruding outwardly from the interior surface of the upper front cowl panel 106. The upper front cowl panel 106 also has an orienting device 222 for orienting the upper front cowl panel 106 relative to the supporting frame 82 during installation. The orienting device 222 includes an annular protrusion 224 extending around the through-bore in the port-side lower mounting boss 216.

The locating device 218 and the orienting device 222 advantageously facilitate efficient and accurate installation of the upper front cowl panel 106 onto the upper front side of the supporting frame 82, as follows. Referring to FIG. 21, the technician brings the upper front cowl panel 106 to the upper front side of the supporting frame 82 and partially inserts the dowel pin 220 into a dowel hole 226 (shown in FIG. 15) on the front of the supporting frame 82. The dowel pin 220 is freely rotatable within the dowel hole 226, which allows the technician to rotate the upper front cowl panel 106 relative to the upper front side of the supporting frame 82 until the annular protrusion 224 is aligned with a countersunk bore 228 (shown in FIG. 15) on the supporting frame 82. Next, referring to FIG. 21, the technician presses the upper front cowl panel 106 onto the upper front side of the supporting frame 82, in the direction of the dash-and-dot lines in FIG. 21, which fully inserts the dowels pin 220 into the dowel hole 226 and the annular protrusion 224 into the countersunk bore 228. This advantageously automatically aligns the various mounting bosses 216 with threaded bores on the supporting frame 82. Thereafter, the technician installs externally visible fasteners 232 through the bores extending through the mounting bosses 216 and into engagement with the respective threaded bores so as to fixedly mount the upper front cowl panel 106 onto the supporting frame 82.

Figure 19:
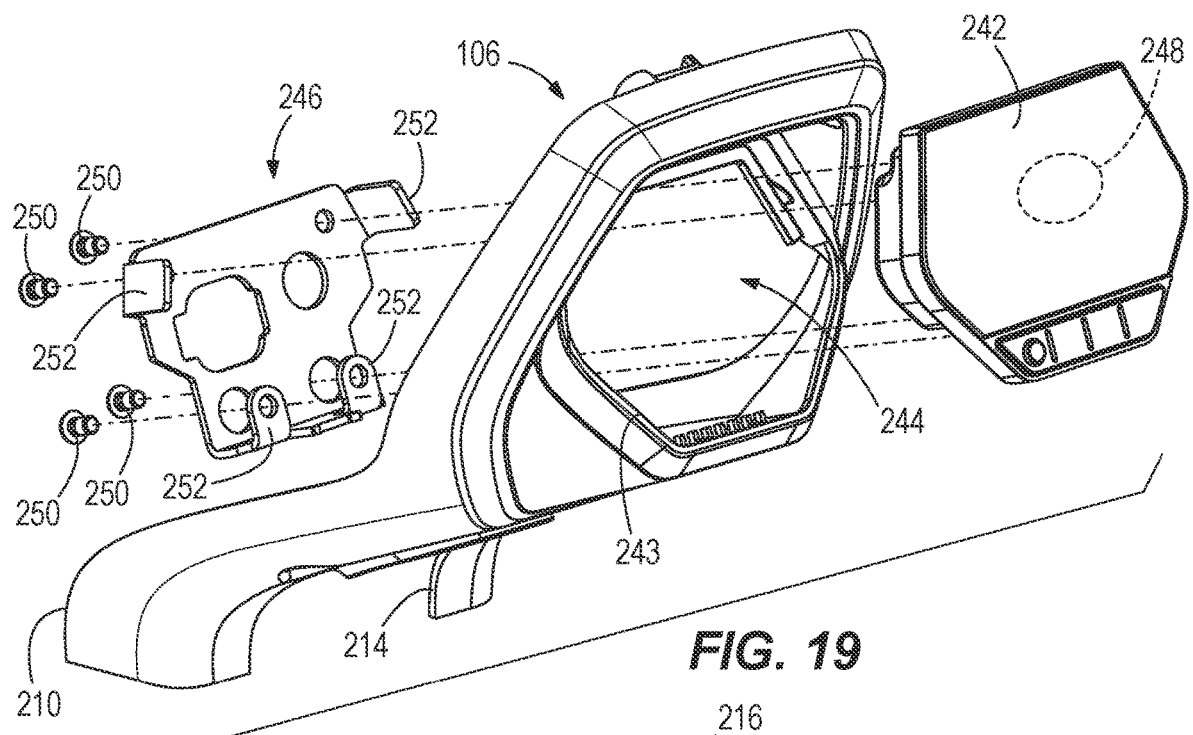
FIG. 19 is an exploded view of a display screen, an upper front cowl panel and a backing bracket for mounting the display screen to the upper front cowl panel.
Figure 20:
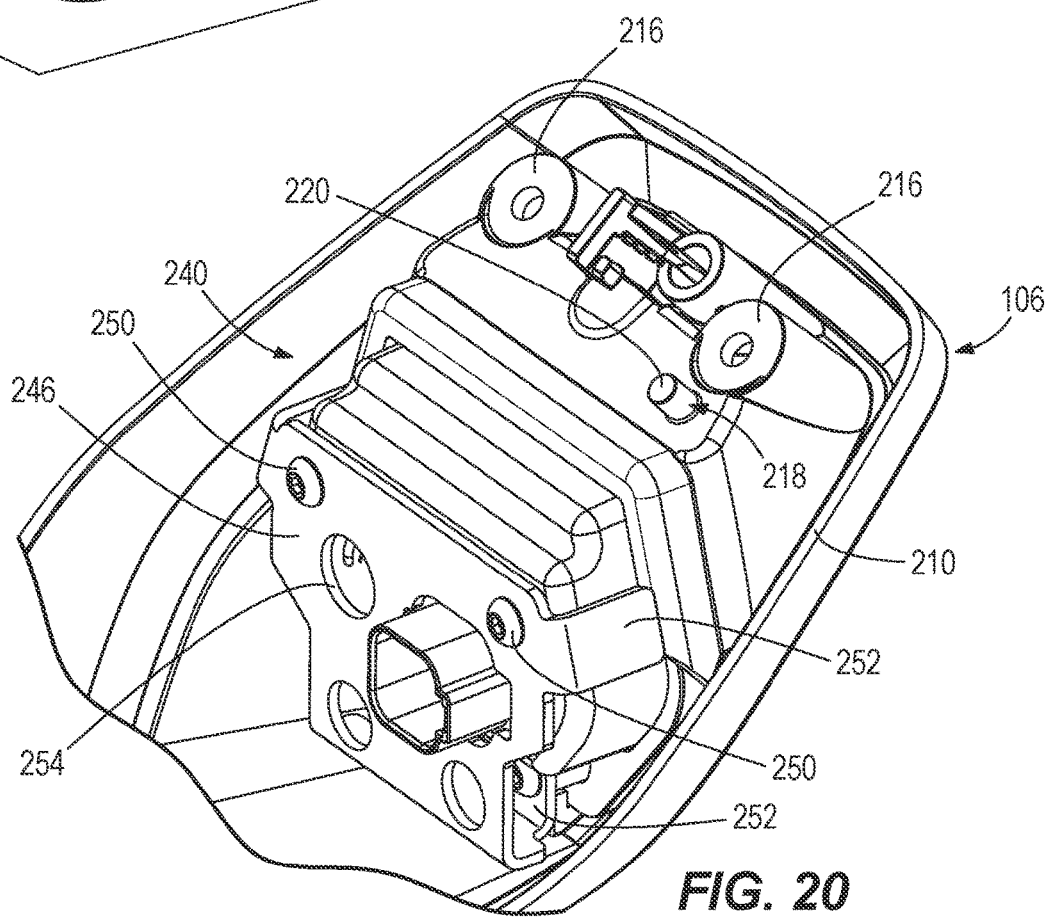
FIG. 20 is a partial interior view of the backing bracket, display screen, and upper front cowl panel.

Referring to FIGS. 19 and 20, prior to installation of the upper front cowl panel 106 onto the supporting frame 82, a display screen device 240 is installed on the upper front cowl panel 106. The display screen device 240 has a planar display screen 242 that is set at an angular orientation so that the it is easily visible from in front of and above the marine drive 50, for example by a person sitting or standing in the marine vessel, proximate to the transom. The upper front cowl panel 106 has an opening 244 in which the display screen device 240 is disposed. Mounting edges 243 frame the opening 244. The display screen device 240 is mounted to the upper front cowl panel 106, as illustrated in dashed lines in FIG. 19. In particular, a backing bracket 246 is installed into the rear of the rear of the opening 244 and the planar display screen 242 is installed into the front of the opening 244. The backing bracket 246 is affixed to the planar display screen by fasteners 250 242, sandwiching the mounting edges 243 therebetween. Bracket arms 252 on the backing bracket 246 help retain the planar display screen 242 in place.

The upper portion of the opening 244 is defined by the top of the upper cowl panel 106, which is supported on arms 103, 105 that laterally inwardly extend from the upper forward edges of the port and starboard side cowl panels 100, 102. The top of the upper cowl panel 106 and the arms 103, 105 together define a top portion of the opening 244 which longitudinally overhangs the top of the planar display screen 242. Thus the top of the opening 244 provides sunshade to the planar display screen 242, facilitating easier viewing. Optionally the display screen device 240 contains a conventional Global Positioning System sensor or "GPS puck 248", which is aligned with a corresponding hole 254 in the backing bracket 246. This ensures that the backing bracket 246, which is made of metal, does not interfere with wireless signals to and from the GPS puck 248.

Figure 27:
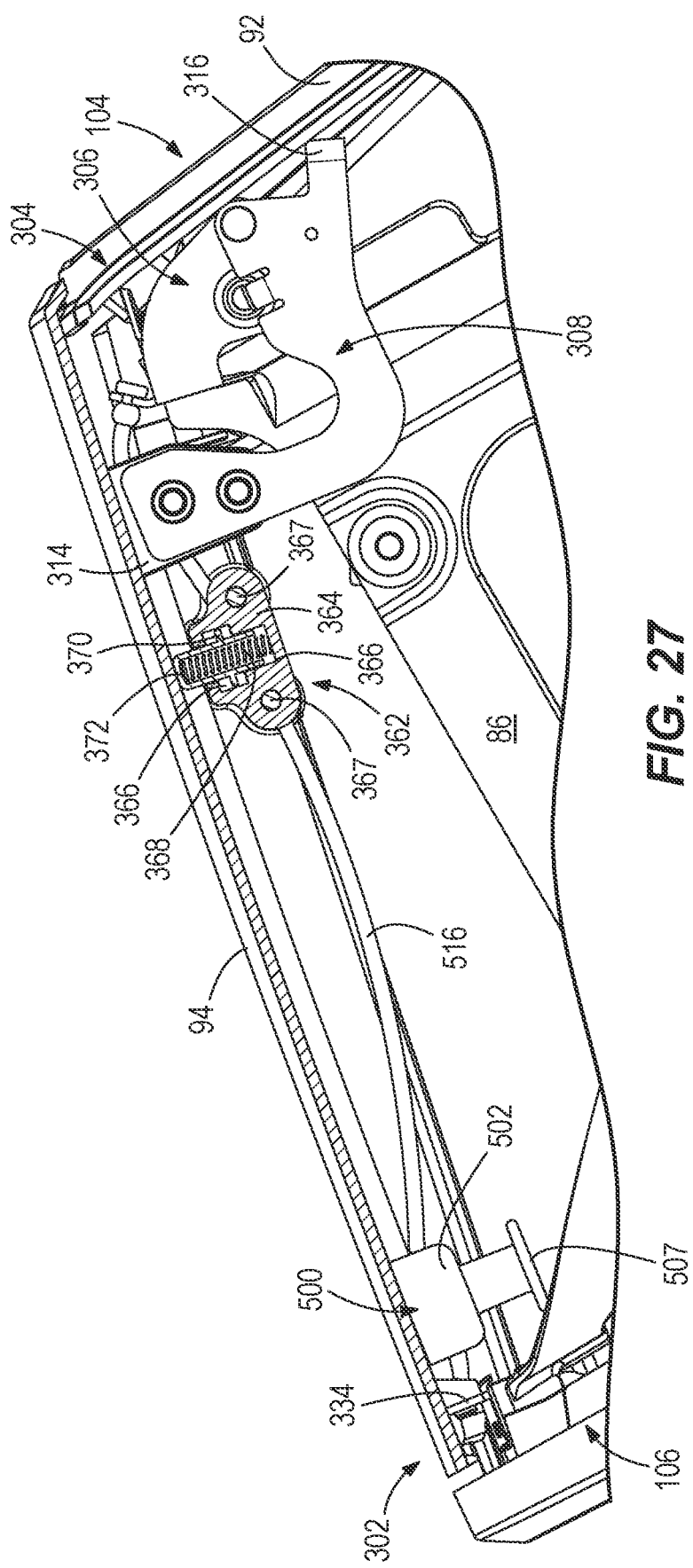
FIG. 27 is a sectional view illustrating the lid in the closed position, and also illustrating the latch, the motor port cover mounted on the pedestal, and a hinge that pivotably couples the lid to the supporting frame.
Figure 28:
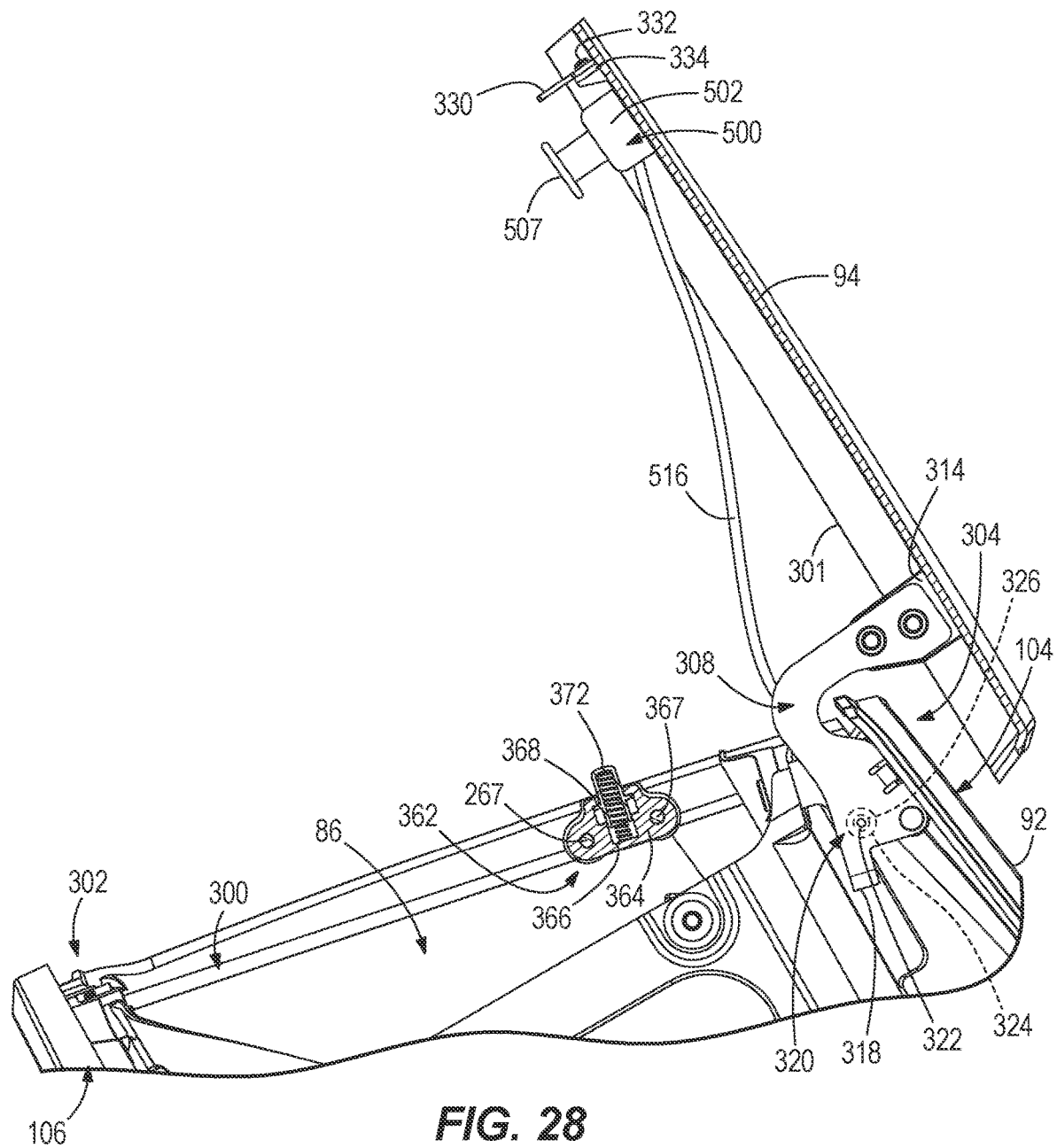
FIG. 28 is a view like FIG. 27, illustrating the lid in the open position.

Now referring to FIGS. 27 and 28, the second cowl portion or lid 94 is movable relative to the first cowl portion or cowl body 92 into and between a closed position (see FIG. 27) enclosing the frame interior 86 and surrounding cowling interior 300, and an open position (see FIG. 28) exposing and providing access to the frame interior 86 and surrounding cowling interior 300. The lid 94 is a generally trapezoidal, plate-like member having downwardly turned side edges 301 which overlap the upper edges of the port and starboard side cowl panels 100, 102 when the lid 94 is in the closed position. The lid 94 has a front end which is latched to the supporting frame 82 by a latch 302, and a rear end which is pivotally coupled to the supporting frame 82 by a hinge 304.

Figure 13:
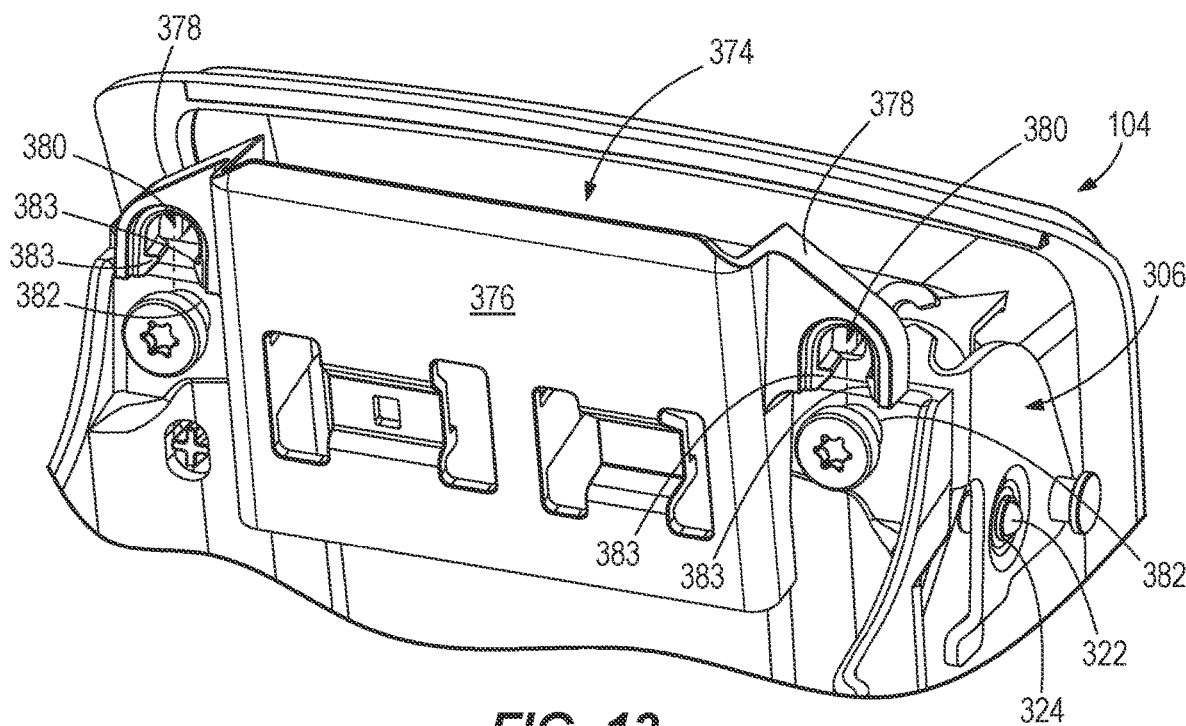
FIG. 13 is a perspective view of a fuse carrier prior to installation onto the supporting frame.

Referring to FIGS. 2, 13, 27 and 28, the hinge 304 includes a stationary frame 306 (which is best shown in FIGS. 2 and 13) which is fixed to the supporting frame 82 and opposing hinge arms 308 (which are best shown in FIGS. 2, 27 and 28) which pivotally couple the lid 94 to the stationary frame 306 along a pivot axis. The stationary frame 306 is affixed to the supporting frame 82 during assembly of the rear cowl panel 104 onto the supporting frame 82. The stationary frame 306 includes a generally U-shaped plate member having a stationary body 310 and opposing stationary arms 312 that extend transversely from the stationary body 310. Holes are formed through opposing ends of the stationary body 310 for receiving fasteners 130, as illustrated by dash-and-dot lines in FIG. 2, during assembly of the rear cowl panel 104, as described herein above. The fasteners 130 fasten the stationary frame 306 in a position between the top of the rear cowl panel 104 and the top of the rear of the supporting frame 82. Referring to FIGS. 27 and 28, the opposing hinge arms 308 are generally L-shaped plate members having a first end pivotally coupled to the opposing stationary arms 312 along the pivot axis by a fastener such that the hinge arms 308 are pivotable with respect to the opposing stationary arms 312 into and between the illustrated positions. The hinge arms 308 have a second end fastened mounting flanges 314 fixed to and extending downwardly from the interior surface of the lid 94, proximate to the rear of the lid 94. A stop finger 316 transversely extends transversely inwardly from the first end of each hinge arm 308. The stop fingers 316 engage a lower stop surface 318 on the supporting frame 82 to as to stop pivoting motion of the lid 94 in the open position illustrated in FIG. 22.

Referring to FIGS. 13 and 28, a detent mechanism 320 is specially configured to retain the hinge arms 308 in the open position. The detent mechanism 320 includes a ball 322 retained within a cylinder 324 in the stationary arm 312. The ball 322 is retained in the cylinder 324 but is biased outwardly therefrom by a compression spring in the cylinder 324 such that the ball 322 protrudes partially outwardly from the cylinder 324 into abutting engagement with the interior surface of the hinge arm 308. A corresponding inwardly oriented spherical indentation or recess 326 is formed in the hinge arm 308. The recess 326 becomes aligned with the ball 322 when the lid 94 is pivoted into the open position illustrated in FIG. 22, the stop fingers 316 engage the lower stop surface 318, in which position the noted spring biases the ball 322 into the recess 326, so as to pop into the recess and retain the lid 94 in the open position. When it is desired to move the lid 94 out of the open position in the direction of arrow 321, the user pushes on the lid 94, which overcomes the spring bias to push the ball 322 out of the recess 326 as the hinge arms 308 are pivoted relative to the stationary frame 306.

Figure 23:
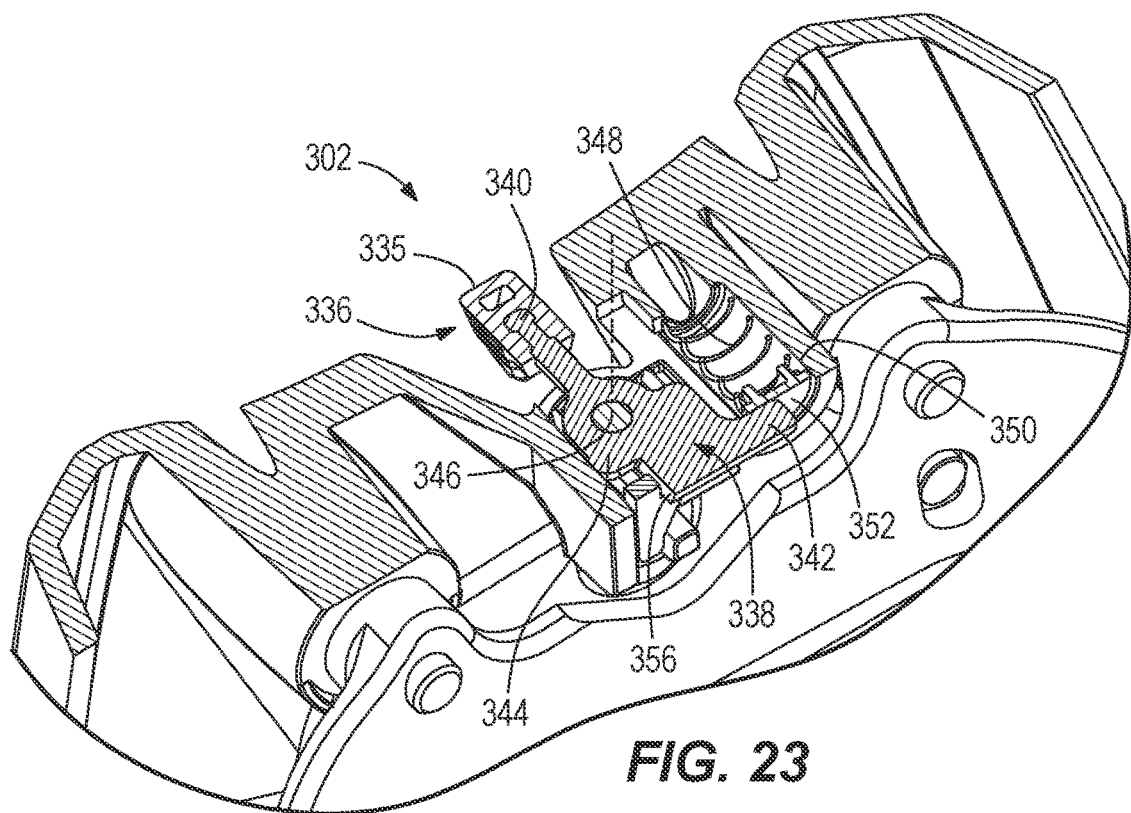
FIG. 23 is a view of section 23-23, taken in FIG. 22, illustrating a latch in a latched position for closing a lid on the supporting frame, thereby enclosing the frame interior.
Figure 24:
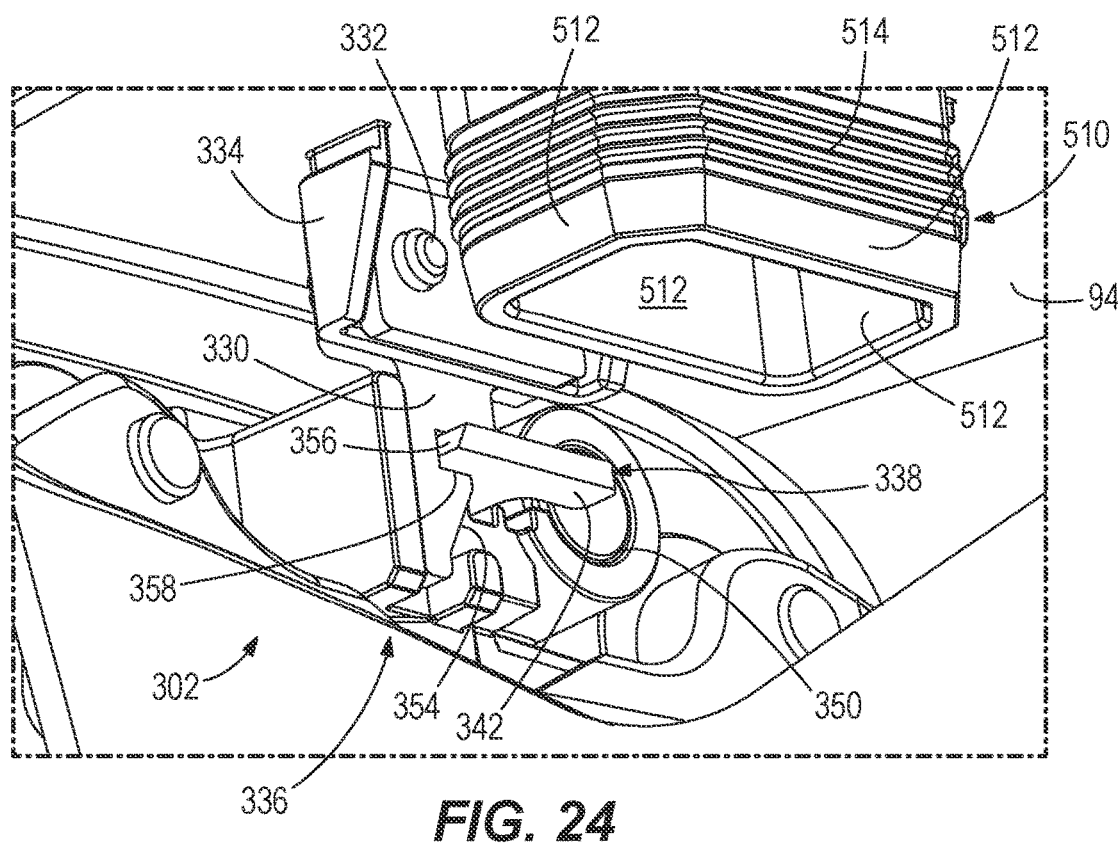
FIG. 24 is an interior perspective view of the lid latched to the supporting frame by the latch, and a pedestal for retaining a first embodiment of a motor port cover in a storage position.
Figure 25:
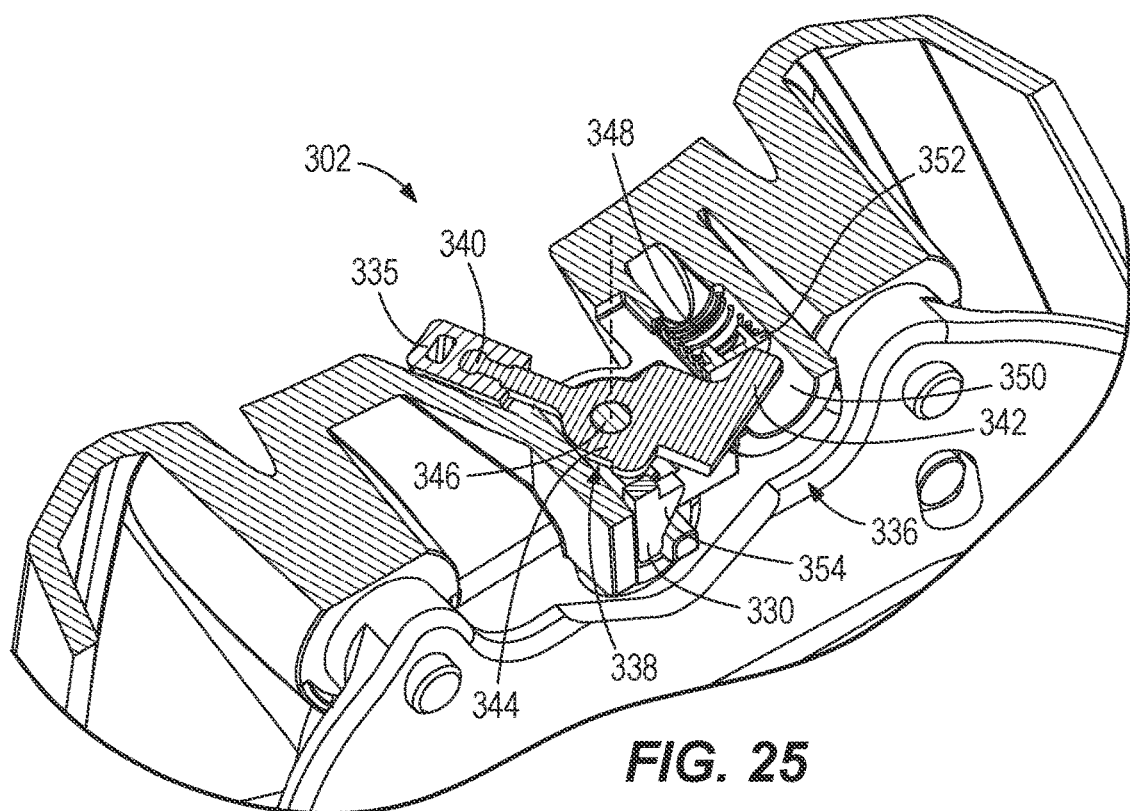
FIG. 25 is a view of section 23-23, taken in FIG. 22, illustrating the latch in an unlatched position for opening the lid and exposing the frame interior.

Referring to FIGS. 23-26, the latch 302 includes a latch engagement arm 330 which in the illustrated example is a hook-shaped plate member that is fixed to the interior surface of the lid 94, at the front thereof, in particular by fasteners 332 fixed to a mounting flange 334, configured such that the latch engagement arm 330 protrudes downwardly from the interior surface of the lid 94. Referring to FIGS. 23 and 25, the latch 302 also includes a latch retainer 336 mounted on the supporting frame 82, particularly along the top front portion thereof within the opening 244 in the upper cowl panel 106. As further described herein below, the latch 302 is configured such that pivoting the lid 94 into the closed position illustrated in FIG. 27 causes the latch retainer 336 to automatically retain the latch engagement arm 330 and thereby retain the lid 94 in the closed position.

Referring to FIG. 23, the latch retainer 336 includes a latch lever 338, which is a generally L-shaped member having a first lever end 340 protruding outwardly from the cowling 90, particularly into the opening 244 in the upper front cowl panel 106, above the display screen device 240. A finger grip 335 is disposed on the first lever end 340, facilitating actuation of the latch lever 338. The latch lever 338 has an opposite, second lever end 342 which is located in the cowling interior 300 and extends transversely to the first lever end 340. A lever body 344 connects the first and second lever ends 340, 342. A pivot pin 346 axially extends through the lever body 344 and into engagement with the upper front cowl panel 106, alongside the upper front portion of the supporting frame 82 and defines a latch pivot axis. The latch lever 338 is pivotable about the latch pivot axis and relative to the upper front cowl panel 106 and the upper front portion of the supporting frame 82. A compression spring 348 is contained in a cylindrical spring cavity 350 formed in the upper front cowl panel 106. An end cap 352 retains the spring 348 in the spring cavity 350 and the bias of the spring 348 tends to move the end cap 352 outwardly to the outer end of the spring cavity 350. The second lever end 342 abuts the end cap 352, opposite the spring 348. As such, the spring 348 tends to pivot the latch lever 338 about the pivot axis into the position illustrated in FIG. 23.

FIGS. 23-24 illustrate the latch retainer 336 in an engaged position. The spring 348 tends to expand, which moves the end cap 352 to the outer end of the spring cavity 350, as illustrated, which thus pivots the latch lever 338 about the latch pivot axis, clockwise when viewed from the top. As illustrated in FIG. 24, the latch engagement arm 330 has an angled engagement surface 354 and the latch lever 338, along the outside of the lever body 344, has a beveled engagement surface 356. As the lid 94 is pivoted into the closed position, the latch engagement arm 330 is brought down onto the latch lever 338 and the angled engagement surface 354 engages and slides along the beveled engagement surface 356. Thus causes the latch lever 338 to pivot about the latch pivot axis, counterclockwise when viewed from above, forcing the end cap 352 into the spring cavity 350 and compressing the spring 348. Once the angled engagement surface 354 passes by the beveled engagement surface 356, the resiliency of the spring 348 moves the end cap 352 back outwardly in the spring cavity 350, which pivots the latch lever 338 back clockwise about the latch pivot axis and causes the lever body 344 to engage with an engagement recess 358 in the latch engagement arm 330. Engagement of the lever body 344 in the engagement recess 358 retains the lid 94 in the closed position.

Figure 26:
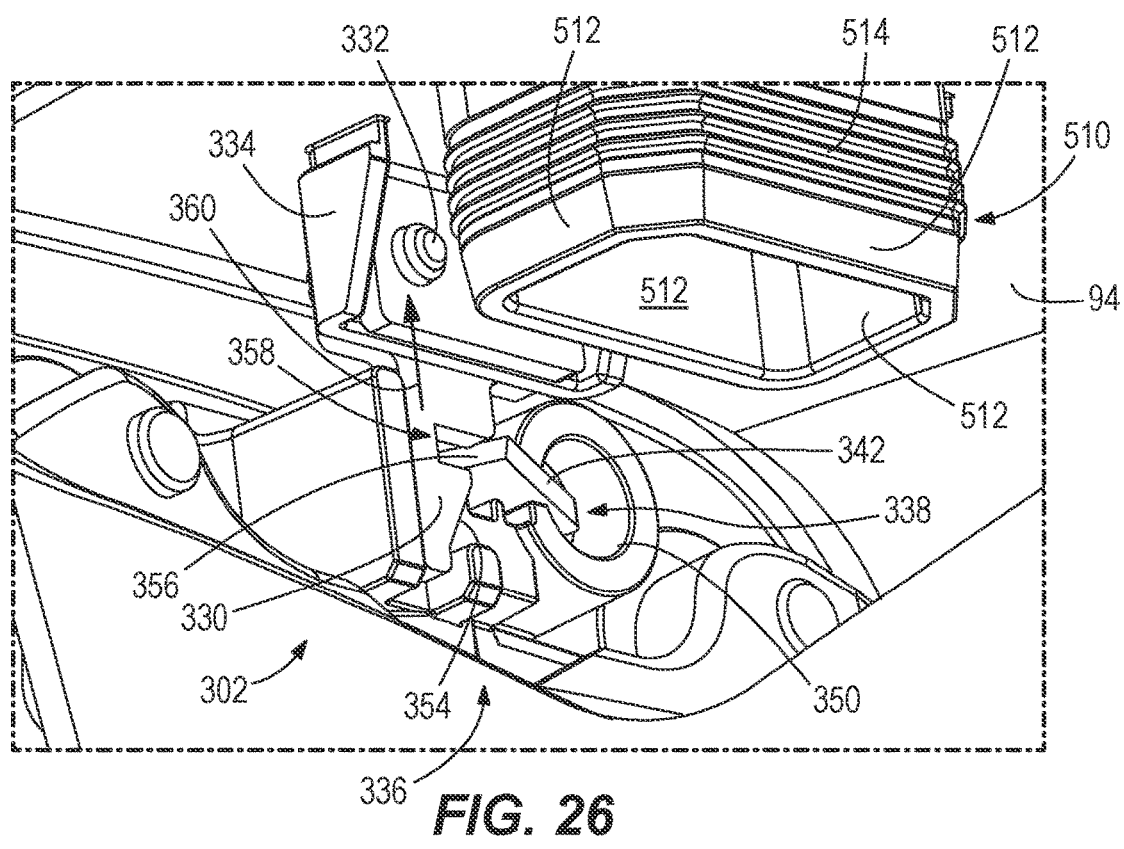
FIG. 26 is an interior perspective view of the lid unlatched from the supporting frame.

Referring to FIGS. 25-26, when it is desired to move the lid 94 out of the closed position, the user engages the finger grip 325 and pivots the latch lever 338 counterclockwise when viewed from above into the position illustrated. This forces the end cap 352 further into the spring cavity 350 and compresses the spring 348 and moves the lever body 344 out of the engagement recess 358 and thus out of engagement with the latch engagement arm 330, freeing the lid 94 for movement in the direction of arrow 360 in FIG. 26. Once the user releases the finger grip 325, the natural resiliency of the spring 348 pushes the end cap 352 back towards the outer end of the spring cavity 350 and pivots the latch lever 338 clockwise when viewed from above into the position illustrated in FIG. 23.

Referring to FIGS. 27 and 28, optionally, port and starboard opening assist mechanisms 362 are located along the upper edges of the port and starboard side cowl panels 100, 102. The port and starboard opening assist mechanisms 362 are configured to engage the interior surface of the lid 94, alongside the downwardly turned side edges 301 when the lid 94 is in the closed position. Each opening assist mechanism 362 includes a spring retainer 364 which is fastened to one of the respective port and starboard side cowl panels 100, 102 by fasteners 367. The spring retainer 364 has an elongated spring cavity 366 which retains a compression spring 368. A scratch-resisting spring cap 372 is disposed on the outer end of the spring 368 and has an annular retainer flange 370 contained in a widened portion of the spring cavity 366. The opening assist mechanisms 362 are configured to bias the lid 94 out of the closed position illustrated in FIG. 27 when the latch 302 is unlatched. In particular, the spring 368 biases the lid 94 into a slightly opened position by tending to extend outwardly of the spring retainer 364, thus causing the spring cap 372 to push upwardly on the interior surface of the lid 94 and thereby pivot the lid 94 away from the closed position. Containment of the annular retainer flange 370 in the widened portion of the spring cavity 366 limits the travel of the spring 368. Thus when the latch 302 is unlatched, the port and starboard opening assist mechanisms 362 automatically pivot the lid 94 slightly out of the closed position, which enables the user to use their fingers to grasp the underside of the perimeter of the lid 94 and further pivot the lid 94 toward the open position illustrated in FIG. 28.

Figure 14:
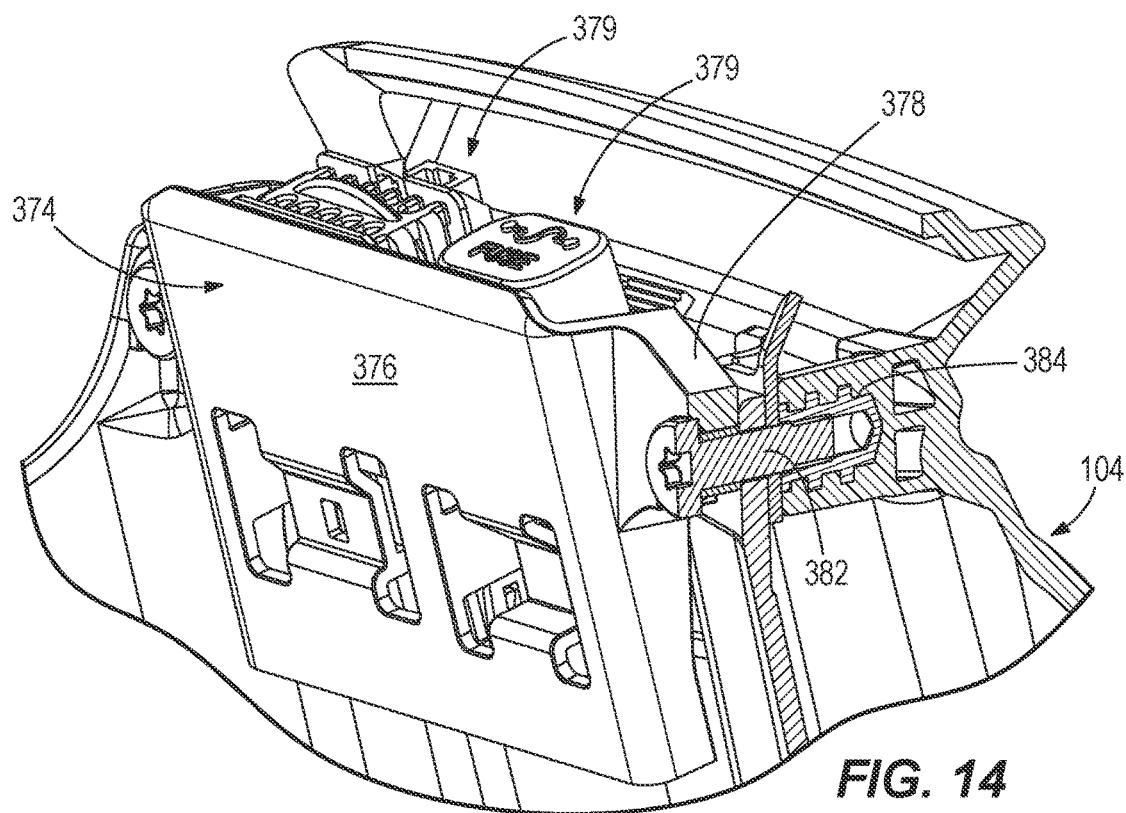
FIG. 14 is a sectional view of the fuse carrier installed onto the supporting frame.

Referring now to FIGS. 13-14, a fuse carrier bracket 374 is mounted to the supporting frame 82, particularly at the upper rear portion of the supporting frame 82 inside the frame interior 86. In the installed position, the fuse carrier bracket 374 is located between the rear of the supporting frame 82 and a battery 400 contained in the frame interior 86, as will be further described herein below. The fuse carrier bracket 374 is specially configured such that it is easily accessible, particularly for removal and installation from above the marine drive 50 without the use of tools when the lid 94 is in the open position. The fuse carrier bracket 374 is a plate-like member having a bracket body 376 that retains fuse components 379 for the marine drive 50. Opposing shoulders 378 laterally extend from opposite sides of the bracket body 376. Each shoulder 378 forms a downwardly oriented recess 380 that receives a mounting post 382 in the frame interior 86, which is formed by a fastener engaged in a threaded bore 384 in supporting frame 82. Each opposing shoulder 378 has inwardly oriented fingers 383 that are spaced apart such that they snap over the mounting posts 382 when the fuse carrier bracket 374 is installed and when the fuse carrier bracket 374 is removed. During installation, the fuse carrier bracket 374 is lowered in the direction illustrated by dash-and-dot lines in FIG. 13 until the mounting posts 382 snap fit into the downwardly oriented recesses 380, over the fingers 383. The opposing shoulders 378 are pliable such that grasping the bracket body 376 and pulling upwardly, generally in the axial direction, overcomes the normal rigidity of the shoulders 378 and thereby separates the fingers 383 apart as the fingers 383 travel along and past the widest part of the mounting posts 382. This frees the fuse carrier bracket 374 for removal from the frame interior 86. In the illustrated embodiment, the fuse carrier bracket 374 is configured for servicing of the fuses, as well as for supporting a diagnostic harness connector.

Figure 29:
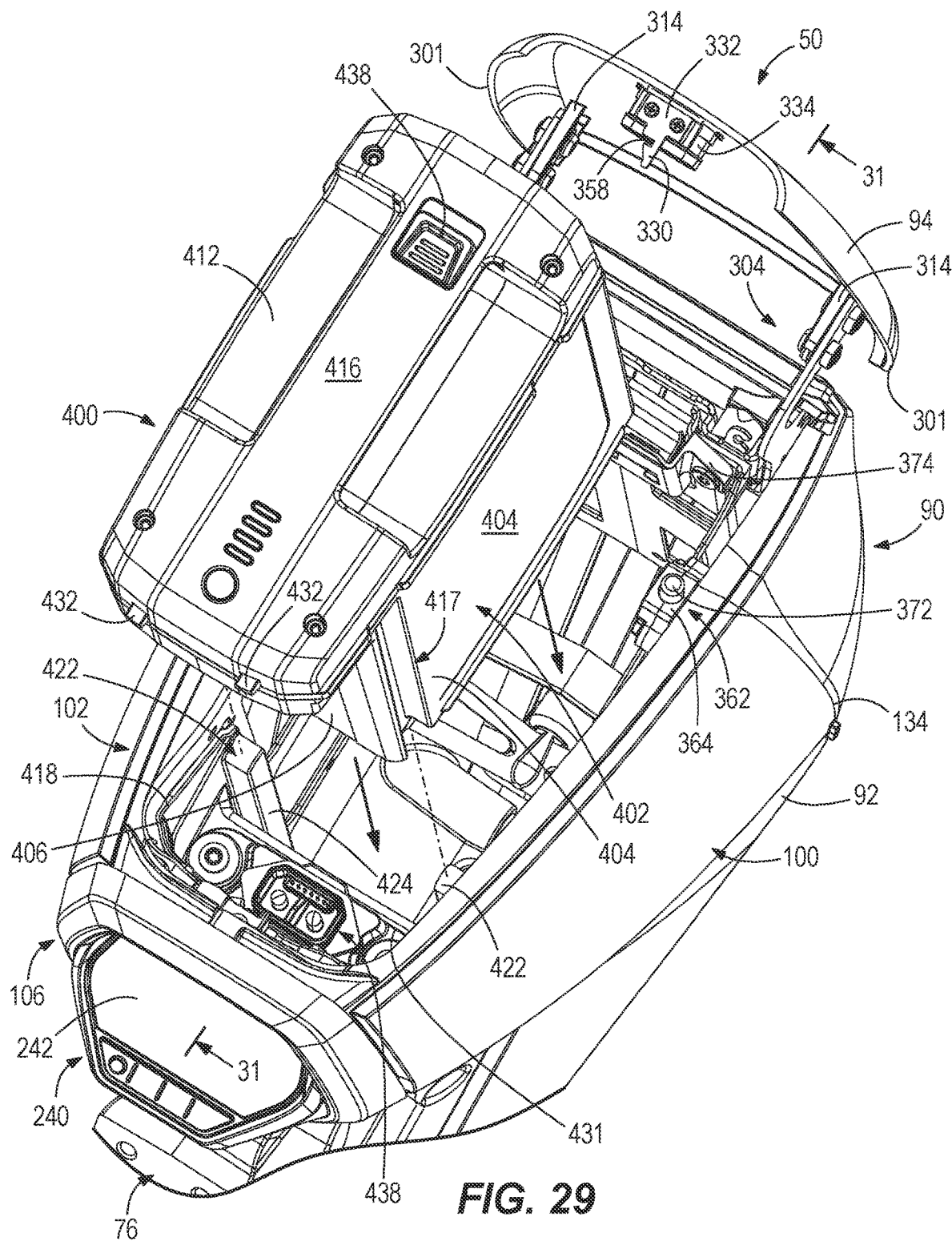
FIG. 29 a perspective view looking down at the marine drive and illustrating installation of a battery into the frame interior.
Figure 30:
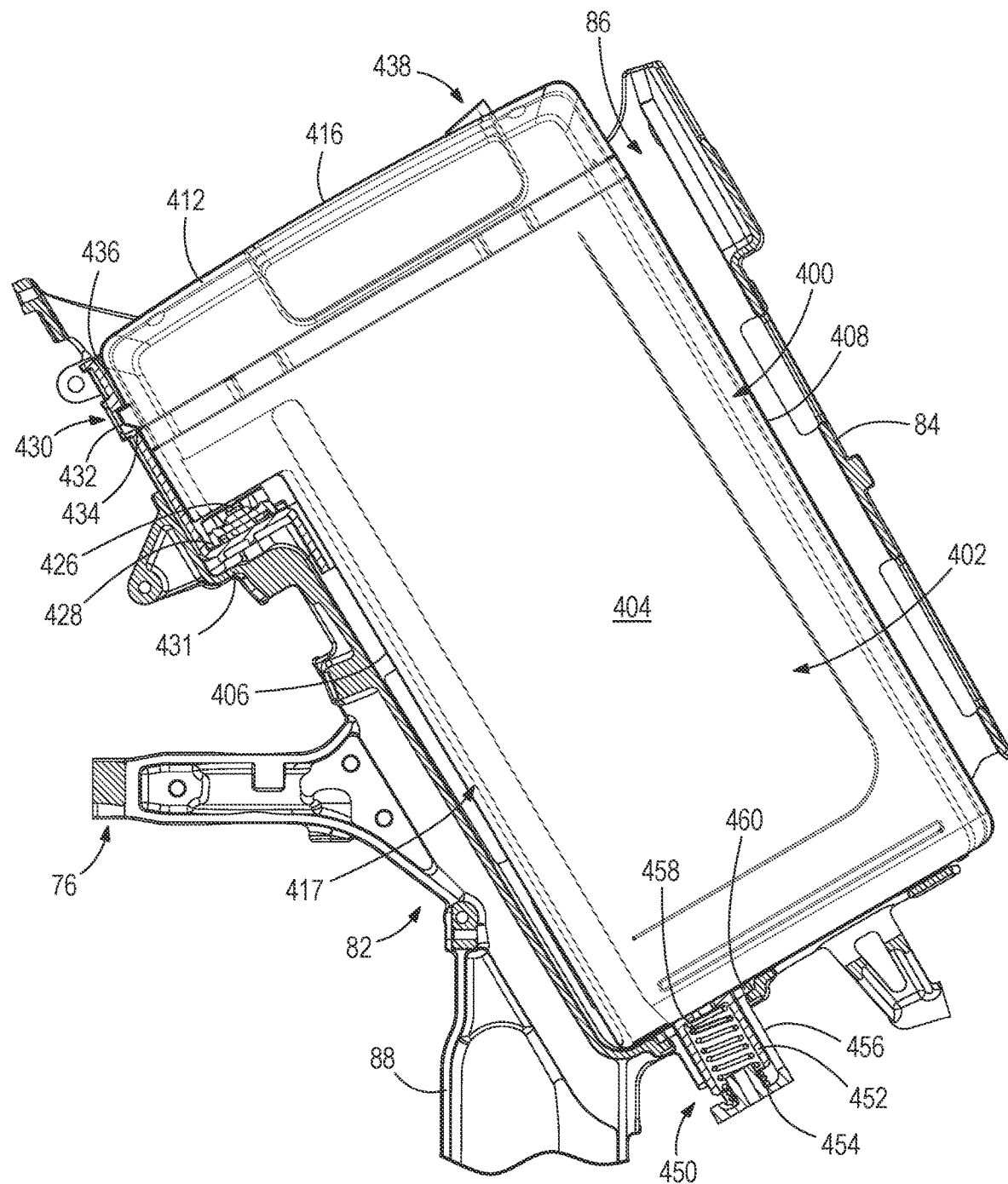
FIG. 30 is a sectional view illustrating the battery installed in the frame interior.

Referring to FIGS. 29-30, the marine drive 50 includes a rechargeable battery 400, which is removably retained in the frame interior 86 and configured to provide electrical (battery) power to the electric motor 64 for powering the propulsor 58. The type and configuration of the battery 400 can vary from what is illustrated and described, and for example can include a lithium battery and/or any other type of rechargeable battery. In the illustrated example, the battery 400 has a box-shaped battery body 402 having opposing side surfaces 404 and opposing front and rear surfaces 406, 408. A ledge portion 410 (best shown in FIG. 33) extends forwardly from the top of the front surface 406 and as further explained herein below has a battery port 426 for connecting the battery 400 to a corresponding motor port 428 for the electric motor 64. The battery 400 also has a top cap 412 located on top of the battery body 402 and ledge portion 410. The top cap 412 has a handle 416, which conveniently enables grasping and lifting of the battery 400 during insertion and removal relative to the frame interior 86. Elongated slots 417 extend along the battery body 402, in particular along the opposing side surfaces 404 adjacent the front surface 406.

The battery 400 is conveniently accessible for removal and replacement by opening the lid 94. Referring to FIG. 2, a guide sleeve 418 is located in the frame interior 86 for guiding the battery 400 into the frame interior 86. The guide sleeve 418 has a generally U-shaped cross-section defined by a U-shaped guide body 420 and opposing guide arms 422 that extend downwardly away from the outer ends of the guide body 420. The guide arms 422 have elongated tracks 424 which are configured to engage with the elongated slots 417 and thereby guide the battery 400 into the frame interior 86 as the slots 417 slide along the tracks 424. The configuration of the guide sleeve 418 can vary from what is illustrated and described. In the illustrated example, the guide sleeve 418 is fastened to the supporting frame 82 by fasteners 425 extending through the sides of the supporting frame 82 and into threaded engagement with threaded bores in the opposing guide arms 422.

Referring to FIGS. 29-30 and 35-36, the battery port 426 is located on the bottom of the ledge portion 410 of the battery 400 and is configured to output battery power from the battery 400. The corresponding motor port 428 is located in the frame interior 86, on an internal ledge portion 431 of the supporting frame 82. The battery 400, supporting frame, 82 and guide sleeve 418 are configured such that inserting the battery 400 into the frame interior 86 automatically engages the battery port 426 with the motor port 428 so that the battery 400 is able to provide electrical power to the electric motor 64. With the lid 94 in the open position, the user grasps the battery handle 416 and lowers the battery 400 into the frame interior 86 while aligning the elongated slots 417 on the battery body 402 with the elongated tracks 424 on the guide sleeve 418. As the battery 400 is lowered into the frame interior 86, the slots 417 slide downwardly along the tracks 424 as the bottom of the ledge portion 410 is brought closer to the internal ledge portion 431 and until the battery port 426 is automatically brought into alignment with and then electrical mating contact with the motor port 428. As will be understood by one having ordinary skill in the art, the battery port 426 and motor port 428 have profiles that correspond to each other such that these components mate together and electrical contacts within each port contact each other when the battery and motor ports 426, 428 are physically joined, thus enabling electricity from the battery 400 to be provided to the electric motor 64. Electrical wires 70 (see FIG. 1) connect the motor port 428 to the electric motor 64, optionally via other electrical auxiliary components, as would be known to one having ordinary skill in the art. The electrical wires extend downwardly through the support leg 88 of the supporting frame 82 and then through the strut 72 and into the lower unit 62 for connection to the electric motor 64 via, for example, a conventional electrical input which may include a printed circuit board.

Referring to FIGS. 29-33, a battery latch 430 engages the battery 400 with the supporting frame 82 as the battery 400 is inserted into the frame interior 86. The battery latch 430 includes a pair of latch fingers 432 on the forward side of the top cap 412 of the battery 400. The latch fingers 432 are spring-biased outwardly from the battery 400 into the position illustrated in FIG. 29. The battery latch 430 also includes a pair of engagement recesses 434 in the supporting frame 82, in particular in an upper front sidewall thereof. The engagement recesses 434 are engaged by the latch fingers 432 when the battery 400 is fully inserted into the frame interior 86. As the battery 400 is slid into the frame interior 86, a ramp 436 on the supporting frame 82 is engaged by the latch fingers 432, which pushes the latch fingers into the battery 400 against the spring-bias. As the battery 400 is fully inserted into the frame interior 48, the latch fingers 432 become aligned with the engagement recesses 434 (see FIG. 30), which permits the spring-bias to force the latch fingers 432 back outwardly and into engagement with the engagement recesses 434. This retains (latches) the battery 400 in the frame interior 86.

Figure 31:
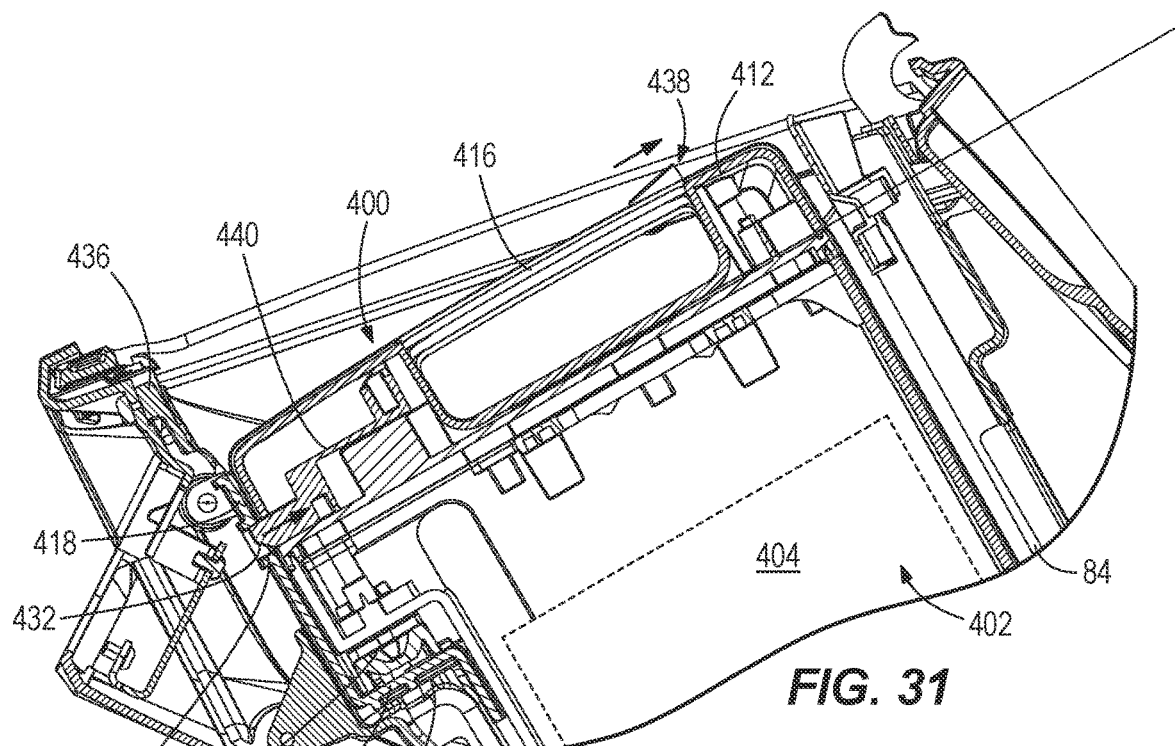
FIG. 31 is a partial view of FIG. 30, illustrating actuation of a latch for removing the battery from the frame interior.
Figure 32:
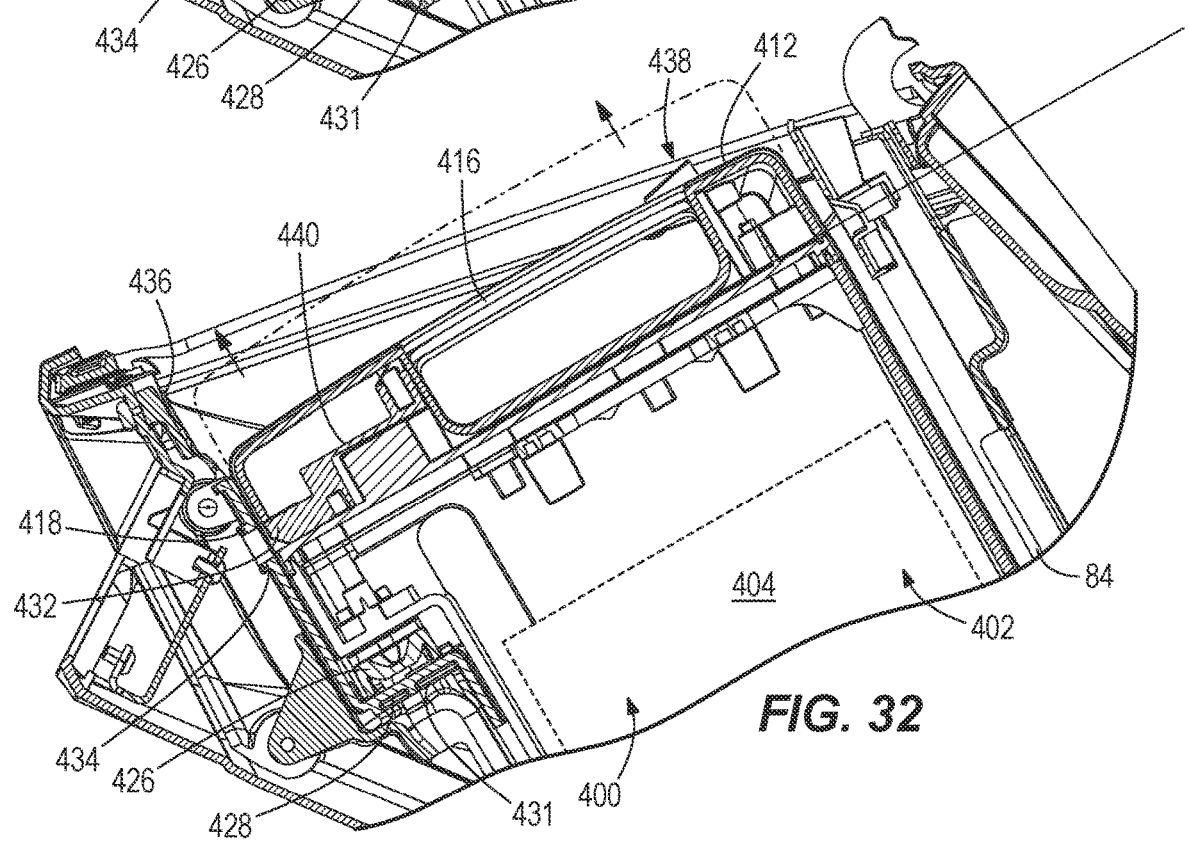
FIG. 32 is a view like FIG. 31, illustrating the latch unlatched for removal of the battery.

Referring to FIGS. 31 and 32, the user can remove the battery 400 from the frame interior 86 by pressing a latch actuator 438 on top of the top cap 412. The latch actuator 438 is coupled to the pair of latch fingers 432 by a linkage 440 such that pressing the latch actuator 438 moves the linkage 440 and the latch fingers 432 in the direction of the arrow illustrated in FIG. 31, removing the latch fingers 432 out of engagement with the engagement recesses 434, withdrawing the latch fingers 432 into the top cap 412 of the battery 400. This frees the battery 400 for removal from the frame interior 86 in the direction of the arrows in FIG. 32, as illustrated in dash-and-dot line. Thereafter when the user releases the latch actuator 438, the latch fingers 432 are again spring-biased back to the position illustrated in FIG. 29. It will thus be understood that the battery 400 can be efficiently removed by using only one hand. The user can grasp the battery handle 416 and use their thumb to press the latch actuator 438, thus enabling the user to lift the battery 400 out of the frame interior 86.

Figure 33:
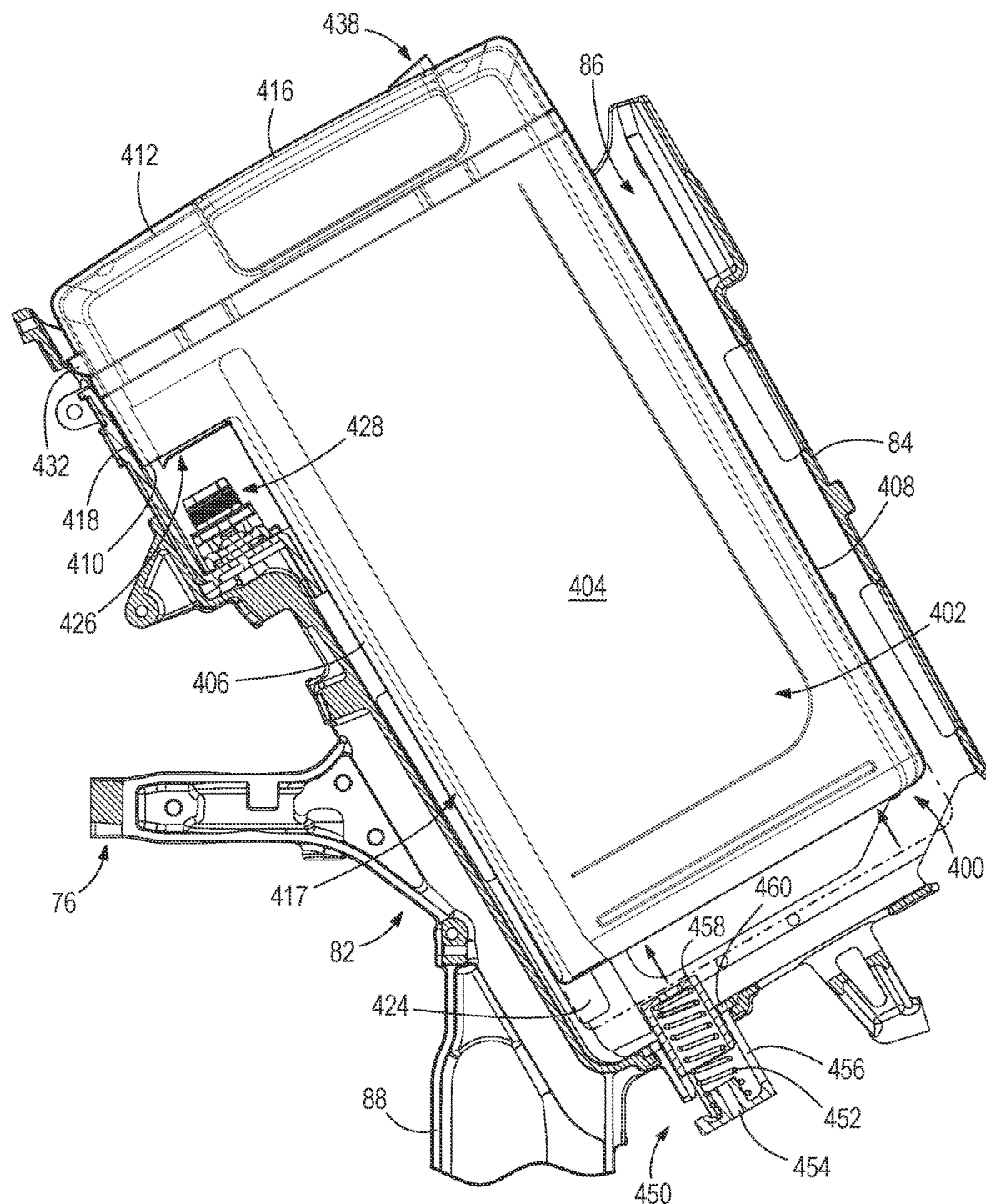
FIG. 33 is a view like FIG. 30, illustrating the battery being removed from the frame interior.
Figure 34:
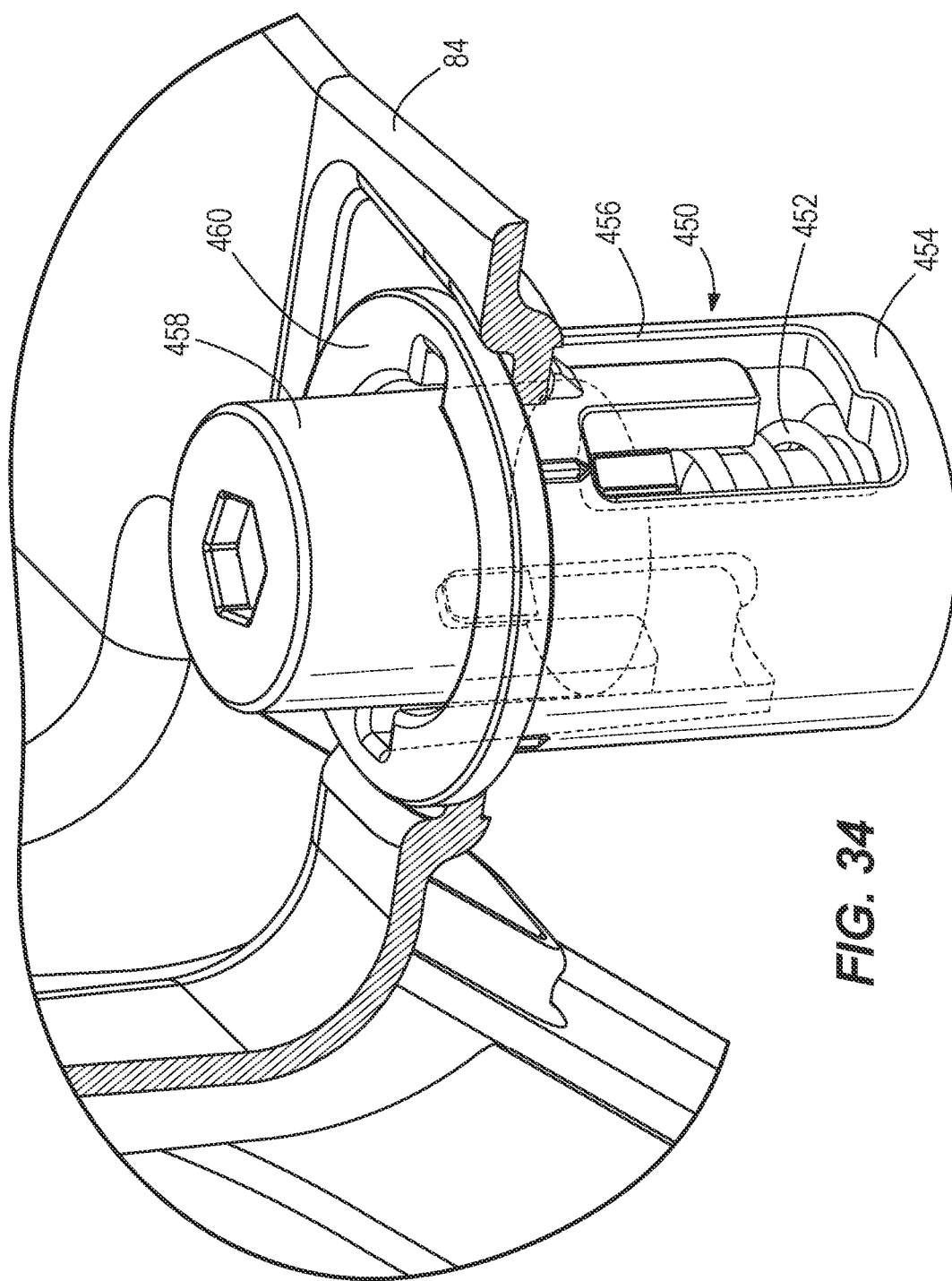
FIG. 34 is a perspective view of a removal assist mechanism for the battery.
Figure 35:
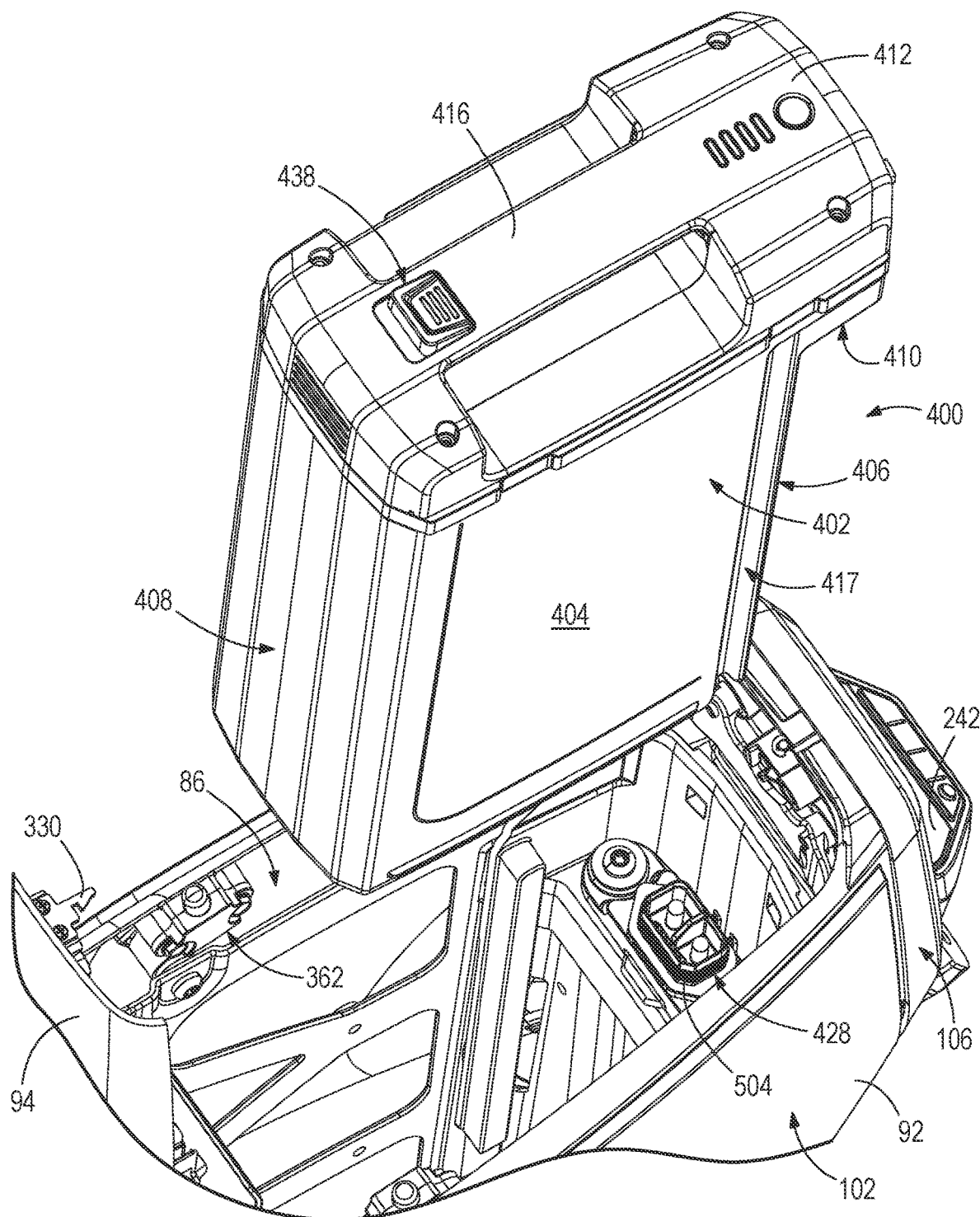
FIG. 35 is a perspective view of the battery removed from the frame interior.

Referring to FIGS. 33 and 34, a battery removal assist mechanism 450 is located in the frame interior 86, in particular in the floor of the monolithic body 84, rearwardly of the support leg 88. The battery removal assist mechanism 450 includes a compression spring 452 disposed on a spring pedestal 454 in a cylindrical spring holder 456 having an annular mounting flange 460 coupled to the floor of the monolithic body 84. A spring cap 458 is located on the spring 452 and coupled to the spring holder 456 such that the spring 452 is compressed between the inside of the spring cap 458 and the floor of the spring holder 456. The spring cap 458 is reciprocal relative to the spring holder 456. Pressing the spring cap 458 further into the spring holder 456 compresses the spring 452. The spring 452 biases the spring cap 458 further out of the spring holder 456.

FIG. 30 illustrates the battery 400 fully installed into the frame interior 86 and latched in place by the battery latch 430. In this position, the bottom of the battery 400 forces the spring cap 458 into the spring holder 456, compressing the spring 452. As illustrated in FIG. 33, when the battery latch 430 is unlatched, the force of the spring 452 biases the battery 400 upwardly in the direction of the arrows in FIG. 33. This moves the battery port 426 out of engagement with the motor port 428, as illustrated, and permits easier removal of the battery 400 from the frame interior 86. The battery 400 moves upwardly a small amount under the force of the spring 452, as illustrated by the solid lines and the dash-and-dot lines in FIG. 33. This also further helps the user by automatically moving the battery 400 upwardly out of the frame interior 86 an amount that facilitates easier grasping of the battery handle 416 and removal from the frame interior 86.

It will thus be understood that moving the lid 94 from the closed position enclosing the frame interior 86 in the cowling interior 300 to the open position provides access to the cowling interior 300 for insertion and removal of the battery 400 from the frame interior 86, for example for recharging and/or service, and replacement of the battery 400 into the frame interior 86 for providing power to the electric motor 64.

Figure 36:
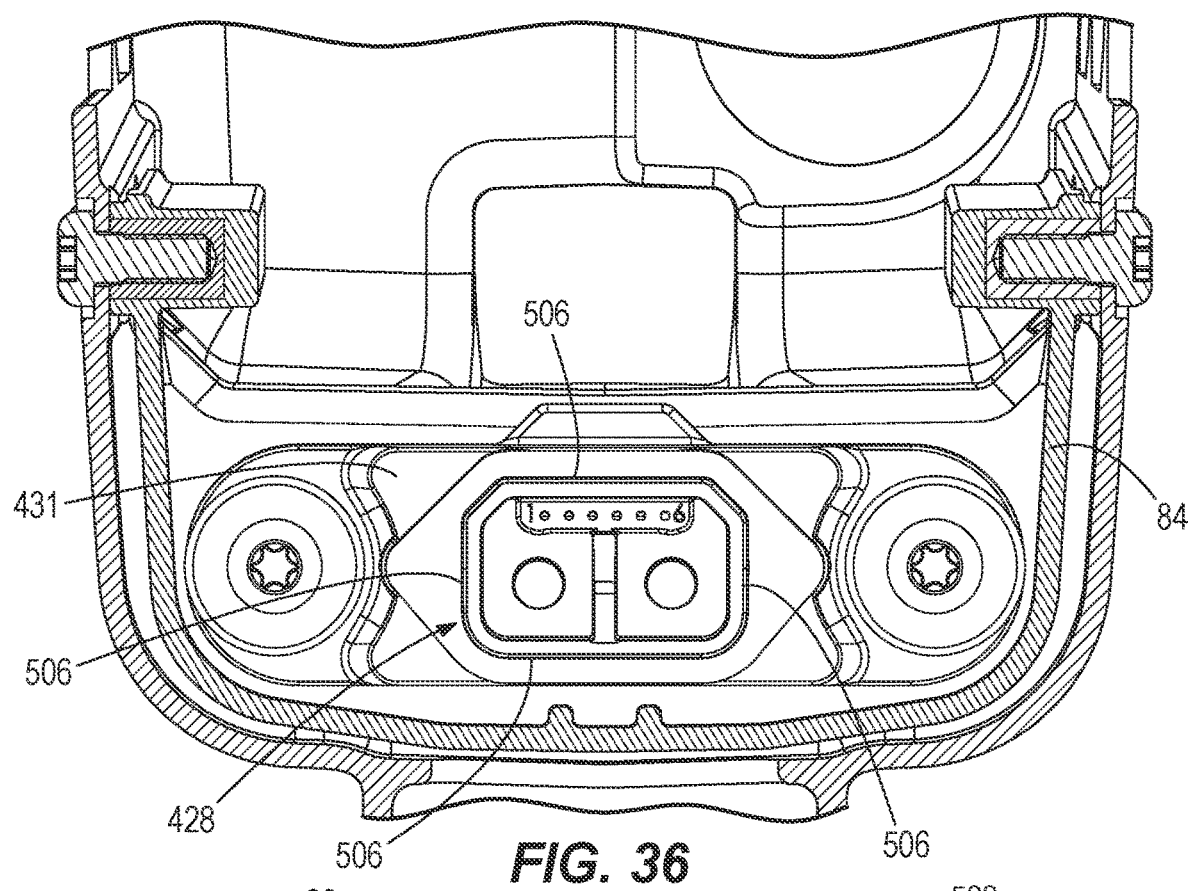
FIG. 36 is a top view of the frame interior, illustrating a motor port for connecting the battery to an electric motor for powering a propulsor on the marine drive.
Figure 37:
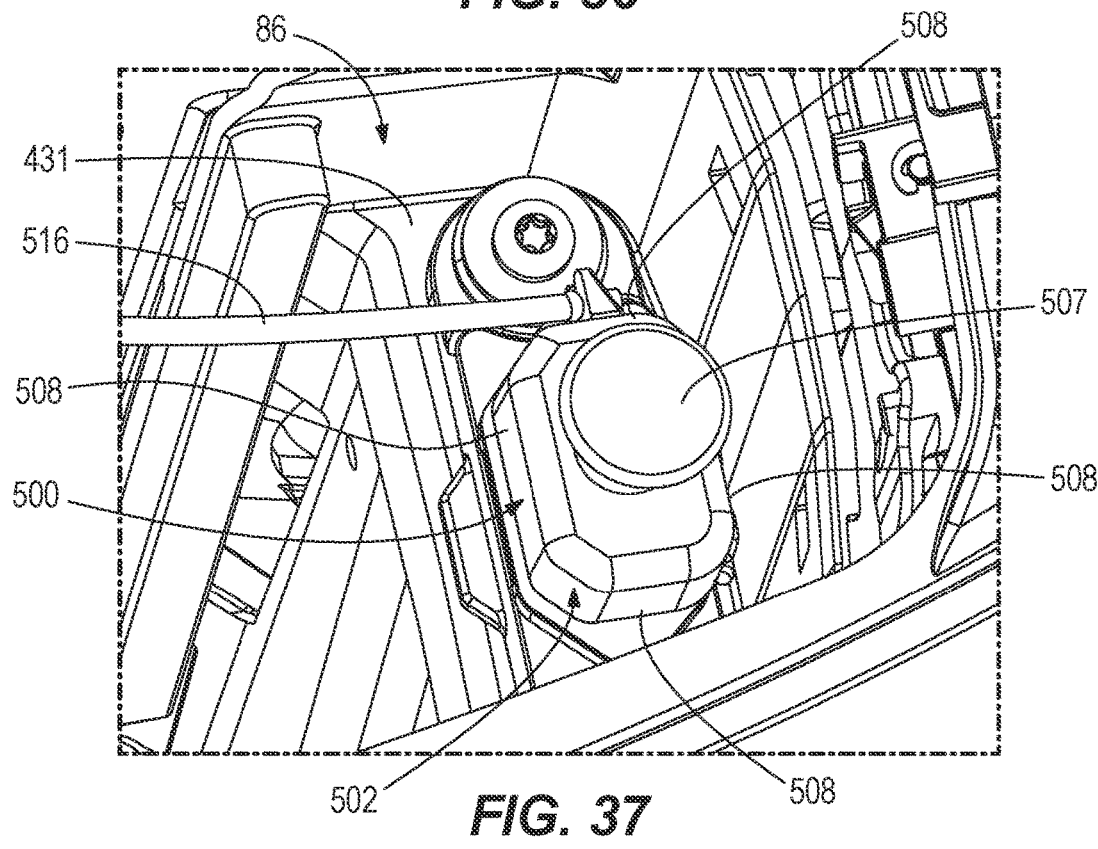
FIG. 37 is a top view of the frame interior illustrating the motor port cover on the motor port.

FIGS. 36-37 illustrate the motor port 428 and a motor port cover 500 for preventing environmental wear or damage of the motor port 428 when the battery 400 is not installed, for example during servicing and/or storage of the marine drive 50. In the illustrated example, the motor port cover 500 has a cover body 502 having sidewalls 508 that form a generally rectangular box shape that is sized just slightly larger than the outer perimeter of the sidewalls 506 of the motor port 428, such that the cover body 502 fits over the motor port 428 in a friction fit arrangement, as illustrated in FIG. 37. Optionally, seals 504 are disposed around the sidewalls 506 of the motor port 428 and form a seal with the interior surfaces of the sidewalls 508 of the generally rectangular shaped cover body 502, forming a friction fit when the cover body 502 is slid onto the motor port 428. In other examples, the cover body 502 can be configured to engage with the motor port 428 via a snap-fit arrangement and/or the like. The cover body 502 has a top wall with a handle 507 which protrudes upwardly from the top wall, facilitating grasping by the user for placement on the motor port 428 during servicing and/or storage of the marine drive 50 and for removal from the motor port 428 when the battery 400 is to be installed.

Referring to FIGS. 24 and 26, a pedestal 510 is located on the interior surface of the lid 94 is configured to retain the motor port cover 500 in a storage position, for example when the battery 400 is installed in the frame interior 86. Just like the motor port 428, the pedestal 510 has sidewalls 512 that form a generally rectangular box shape that is sized just slightly smaller than the inner perimeter of the sidewalls 508 of the cover body 502. Also just like the motor port 428, the pedestal 510 has seals 514 disposed around the sidewalls 512 that form a seal with the interior surfaces of the sidewalls 508 of the cover body 502. Preferably, the motor port 428 and the pedestal 510 have an identical outer perimeter shape and size. Ideally, the pedestal 510 and the motor port 428 have an identical outer perimeter shape and size. As illustrated in FIGS. 27-28, the pedestal 510 provides a secure and sealed location for storing the motor port cover 500 when it is not in use on the motor port 428, thus preventing environmental wear or damage of the motor port cover 500 and thus preventing subsequent transfer of environmental contaminants such as salt and water from the motor port cover 500 to the motor port 428. A tether 516 connects the motor port cover 500 to the supporting frame 82, thus preventing loss of the motor port cover 500, for example by accidentally dropping the motor port cover 500 in the water.

Figure 38:
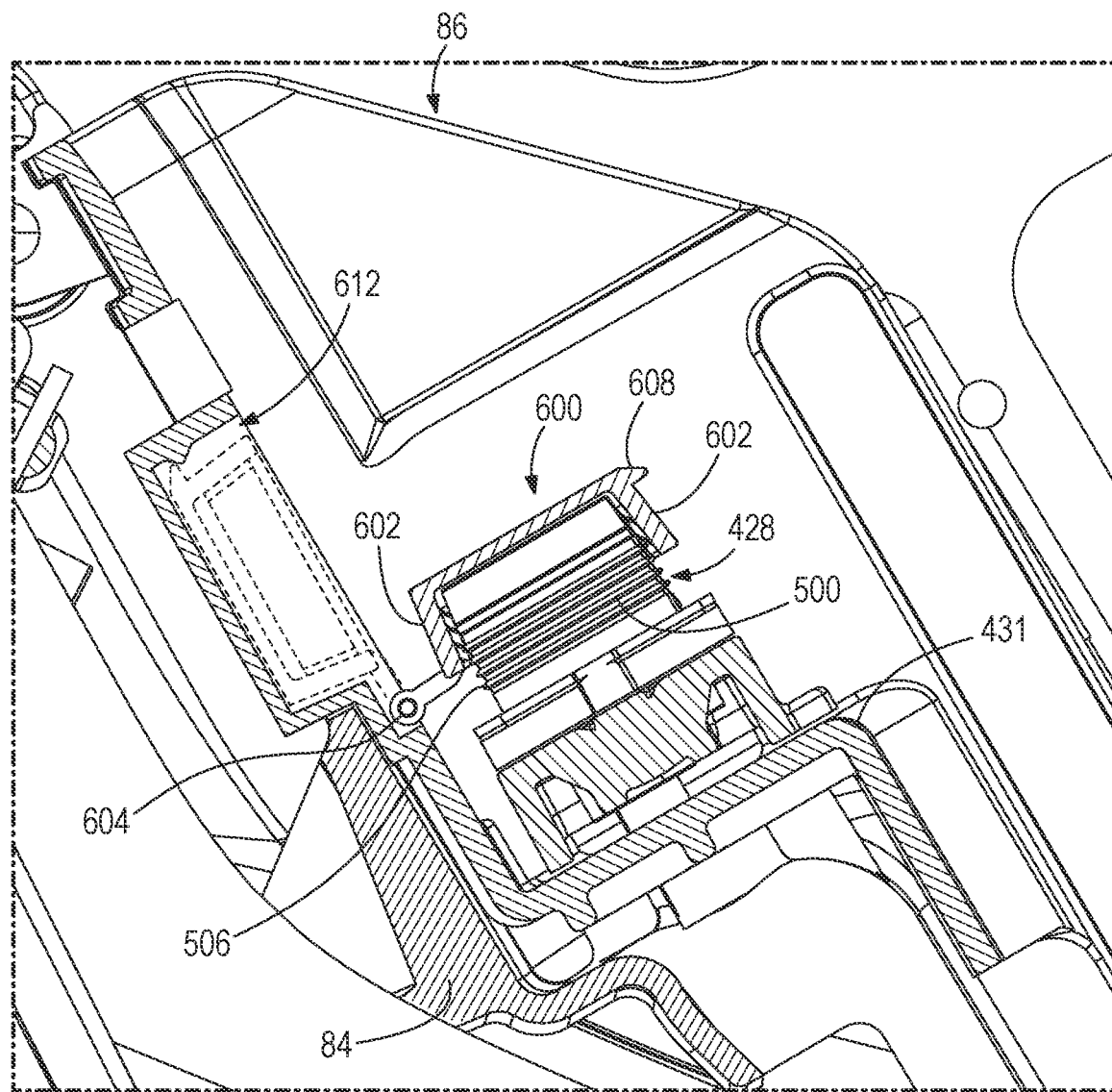
FIG. 38 is a side view of a second embodiment of a motor port cover on the motor port for preventing environmental wear or damage of the motor port, the motor port cover illustrated in solid lines on the motor port and illustrated in dashed lines removed from the motor port.

FIG. 38 illustrates a second embodiment of a motor port cover 600 for preventing environmental wear or damage of the motor port 428 when the battery 400 is not installed, for example during servicing and/or storage of the marine drive 50. The motor port cover 600 is illustrated in solid lines in a use position and in dashed lines in a storage position. In the use position, the motor port cover 600 has sidewalls 602 that surround and abut the sidewalls 506 of the motor port 428 in a friction fit. The motor port cover 600 has an inner end that is pivotally connected to the supporting frame 82 by a hinge 604. Optionally, seals 504 are disposed around the sidewalls 506, similar to the first embodiment, for sealing between the motor port 428 and the interior of the sidewall 602. When it is desired to move the motor port cover 600 into a storage position, for example when the battery 400 is to be installed, the user grasps a lip 608 on the front of the motor port cover 600 and pivots the motor port cover 600 upwardly about the pivot axis defined by the hinge 604. A recess 612 in the sidewall of the supporting frame 82 provides a storage space for the motor port cover 600 in the storage position.

Figure 39:
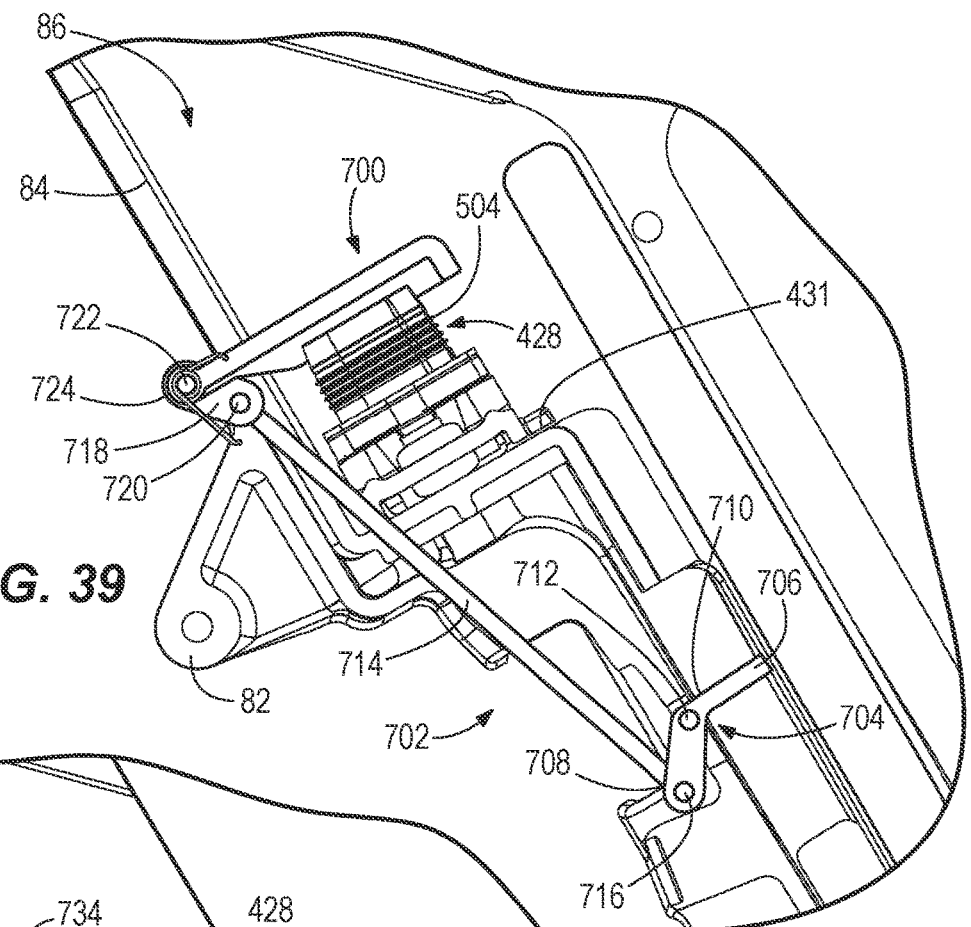
FIG. 39 is a side view of a third embodiment of a motor port cover illustrated on the motor port.
Figure 40:
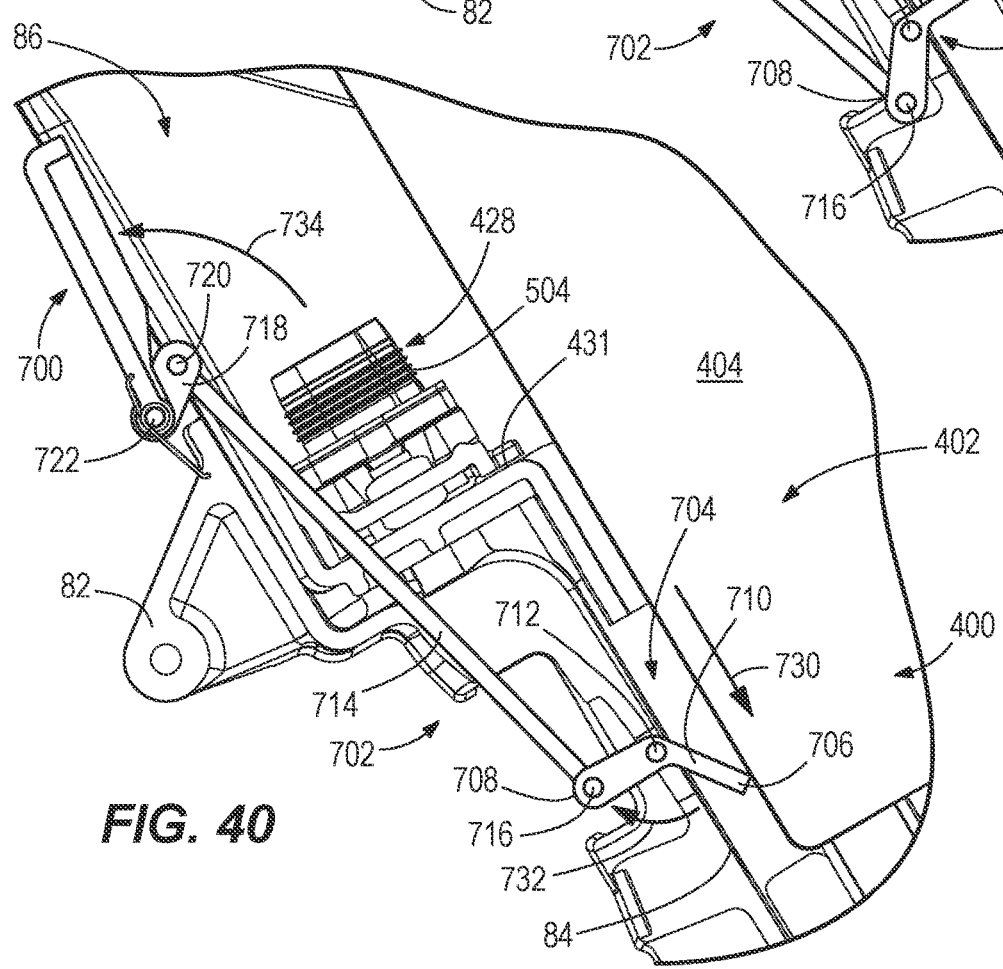
FIG. 40 is a view like FIG. 39, illustrating the motor port cover removed from the motor port.

FIGS. 39 and 40 illustrate a third embodiment of a motor port cover 700 for preventing environmental wear or damage of the motor port 428 when the battery 400 is not installed. Just like the first and second embodiments, the motor port cover 700 is movable into a use position (FIG. 39) in which the motor port cover 700 prevents environmental wear or damage of the motor port 428 and a non-use or storage position (FIG. 40) in which the battery port 426 is connectable to the motor port 428. Unlike the first and second embodiments, the third embodiment is configured such that inserting the battery 400 into the frame interior 86 automatically causes the motor port cover 700 to move from the use position to the non-use or storage position. More specifically, a lever assembly 702 is configured to move the motor port cover 700 into the non-use position. The lever assembly 702 includes a lever arm 704 which is an L-shaped member having a first end 706 that protrudes into the frame interior 86, a second end 708, and a lever body 710 that extends between the first end 706 and the second end 708. The lever body 710 is pivotably coupled to the supporting frame 82 at a lever pivot axis 712. The second end 708 is pivotably coupled to the first end of an elongated linkage bar 714 at a first linkage pivot axis 716. The elongated linkage bar 714 has an opposite, second end that is pivotally coupled to a first end of a crank arm 718 at a second linkage pivot axis 720. The opposite second end of the crank arm 718 is pivotably coupled to the supporting frame 82 at a cover axis 722. A torsion spring 724 on the crank arm axis 722 has a first end coupled to the supporting frame 82 and an opposite, second end coupled to the motor port cover 700.

The motor port cover 700 is normally biased by the torsion spring 724 into the use position illustrated in FIG. 39. The torsion spring 724 has a natural spring bias that acts between the supporting frame and the motor port cover 700 so as to pivot the motor port cover 700 about the cover axis 722 into position over the top of the motor port 428. When the user installs the battery 400 in the manner explained herein above, the battery body 402 slides downwardly in the direction of arrow 730 and as it does so it engages the lever arm 704 and causes the lever arm 704 to pivot about the lever pivot axis 712 in the direction of arrow 732. This moves the elongated linkage bar 714 upwardly and pivots the crank arm 718 in the direction of arrow 734. Such movement of the crank arm 718 moves the motor port cover 700 into the non-use position illustrated in FIG. 40, wherein the motor port cover 700 is out of the way of the battery port 726 and as such permits connection of the battery port 726 to the motor port 728 during continued insertion of the battery 400 in the direction of arrow 730, and as further described herein above. Subsequent removal of the battery 400 from the frame interior 86 allows the torsion spring 724 to again pivot the motor port cover 700 into the use position illustrated in FIG. 39. Thus, it will be understood that moving the battery 400 into the frame interior 86 engages the lever assembly 702 via the lever arm 704 so as to automatically move the motor port cover 700 from the use position illustrated in FIG. 39 to the non-use position illustrated in FIG. 40. Removing the battery 400 from the frame interior 86 permits the bias of the torsion spring 724 to move the motor port cover 700 back into the non-use position illustrated in FIG. 40.

What is claimed is:

1. A marine drive for propelling a marine vessel, the marine drive comprising:
   a propulsor configured to generate a thrust force in a body of water,
   a battery that powers the propulsor, and
   a supporting frame that supports the marine drive relative to marine vessel, the supporting frame extending from a front to a rear in a longitudinal direction, from a port side to a starboard side that is opposite the port side in a lateral direction that is perpendicular to the longitudinal direction, and from a top to a bottom in an axial direction that is perpendicular to the longitudinal direction and perpendicular to the lateral direction,
wherein the supporting frame comprises a monolithic body defining a frame interior, a support leg extending downwardly from the monolithic body, and a steering arm extending forwardly from monolithic body.

2. The marine drive according to claim 1, wherein the battery is disposed in the frame interior, the battery being configured to provide electrical power to an electric motor for powering the propulsor.

3. The marine drive according to claim 1, further comprising a cowling mounted on the supporting frame.

4. The marine drive according to claim 1, further comprising a lower unit mounted on the support leg and containing an electric motor for powering the propulsor.

5. A marine drive for propelling a marine vessel, the marine drive comprising:
a propulsor configured to generate a thrust force in a body of water;
a battery that powers the propulsor;
a supporting frame that supports the marine drive relative to marine vessel, the supporting frame having a frame interior,
wherein the supporting frame extends from a front to a rear in a longitudinal direction, from a port side to a starboard side that is opposite the port side in a lateral direction that is perpendicular to the longitudinal direction, and from a top to a bottom in an axial direction that is perpendicular to the longitudinal direction and perpendicular to the lateral direction, and
a cowling on the supporting frame, the cowling having a first cowl portion and a second cowl portion that is movable relative to the first cowl portion into a closed position enclosing the frame interior and alternately into an open position providing access to the frame interior,
wherein the first cowl portion comprises a cowl body disposed on the front, the bae-rear, the port side and the starboard side, and further wherein the second cowl portion comprises a lid located on the top of the supporting frame, and further wherein the cowl body is fixed to the supporting frame via at least one hidden fastener that extends from the frame interior, through the supporting frame, and into engagement with the cowl body, said hidden fastener being accessible when the lid is in the open position.

6. The marine drive according to claim 5, wherein the supporting frame comprises a monolithic body defining the frame interior, a support leg extending downwardly from the monolithic body, and a steering arm extending forwardly from monolithic body, and further wherein the battery is disposed in the frame interior, the battery being configured to provide electrical power the propulsor.

7. The marine drive according to claim 5, wherein the first cowl portion comprises a plurality of cowl panels, each cowl panel in the plurality of cowl panels comprising a locating device for initially locating the cowl panel on the supporting frame during installation, an orienting device for subsequently rotationally orienting the cowl panel relative to the supporting frame during installation, and a bore for engagement with the hidden fastener once the cowl panel is oriented relative to the supporting frame.

8. The marine drive according to claim 7, wherein the locating device comprises a dowel pin that engages in a corresponding dowel hole on the supporting frame.

9. The marine drive according to claim 7, wherein the orienting device comprises a slotted boss that engages with opposed flats on the supporting frame.

10. The marine drive according to claim 7, wherein the orienting device comprises a dowel pin that engages in a corresponding dowel slot on the supporting frame.

11. The marine drive according to claim 7, wherein the orienting device comprises a boss having an annular protrusion that engages in a countersunk bore on the supporting frame.

12. The marine drive according to claim 7, wherein the plurality of cowl panels comprises a port side cowl panel and a starboard side cowl panel,
wherein the locating device on each of the port side cowl panel and the rear-starboard side cowl panel comprises a dowel pin, and
wherein the orienting device on each of the port side cowl panel and the starboard side cowl panel comprises a slotted boss that engages with flats on the supporting frame.

13. The marine drive according to claim 7, wherein the plurality of cowl panels comprises a rear cowl panel,
wherein the locating device comprises a dowel pin that engages in a corresponding dowel hole on the supporting frame, and
wherein the orienting device comprises a boss having an annular protrusion that engages in a countersunk threaded bore on the supporting frame.

14. The marine drive according to claim 7, wherein the plurality of cowl panels comprises a lower front cowl panel,
wherein the locating device comprises a dowel pin that engages in a corresponding dowel hole on the supporting frame, and
wherein the orienting device comprises a dowel pin that engages in a corresponding dowel slot on the supporting frame.

15. The marine drive according to claim 7, wherein the plurality of cowl panels comprises an upper front cowl panel,
wherein the locating device comprises a dowel pin that engages in a corresponding dowel hole on the supporting frame, and
wherein the orienting device comprises a boss having an annular protrusion that engages in a countersunk threaded bore on the supporting frame.

16. The marine drive according to claim 7, wherein the plurality of cowl panels comprises a rear cowl panel, a port side cowl panel, a starboard side cowl panel, and a front cowl panel.

17. The marine drive according to claim 16, wherein the rear cowl panel comprises an outer perimeter that is sandwiched between rear perimeter edges of the port side cowl panel and the starboard side cowl panel.

18. The marine drive according to claim 17, wherein rear perimeter edges of the port side cowl panel and cowl panel are fastened together.

19. The marine drive according to claim 16, wherein the front cowl panel overlaps the port side cowl panel and the starboard side cowl panel, respectively, covering fasteners for the port side cowl panel and the starboard side cowl panel.

20. The marine drive according to claim 15, further comprising a display screen device, wherein the cowling defines an opening for the display screen device.

21. The marine drive according to claim 20, wherein the display screen device is located on the cowling and angularly oriented relative to the cowling so that the display screen device is visible from in front of and above the marine drive.

22. The marine drive according to claim 21, wherein the cowling, along the top of the opening, overhangs the display screen device so as to provide sunshade to the display screen device.

23. The marine drive according to claim 20, wherein the lid is movable relative to the cowl body into and between a closed position and an open position, and wherein a latch for opening the lid is accessible via the opening.

* * * * *